United States Patent [19]

Sheth

[11] Patent Number: 4,607,348
[45] Date of Patent: Aug. 19, 1986

[54] TRANSFER RATE CONTROL SYSTEM FROM TAPE PERIPHERAL TO BUFFER MEMORY OF PERIPHERAL CONTROLLER

[75] Inventor: Jayesh V. Sheth, El Toro, Calif.

[73] Assignee: Burroughs Corporation, Detroit, Mich.

[21] Appl. No.: 727,603

[22] Filed: Apr. 26, 1985

Related U.S. Application Data

[63] Continuation-in-part of Ser. No. 470,377, Feb. 28, 1983, abandoned.

[51] Int. Cl.⁴ .............................................. G06F 13/12
[52] U.S. Cl. ..................................................... 364/900
[58] Field of Search ... 364/200 MS File, 900 MS File; 360/51; 365/233

[56] References Cited

U.S. PATENT DOCUMENTS

| 3,059,221 | 10/1962 | Page | 364/900 |
|---|---|---|---|
| 3,774,156 | 11/1973 | Marsalka | 364/200 |
| 4,074,352 | 2/1978 | Cook | 364/200 |
| 4,106,092 | 8/1978 | Millers | 364/200 |
| 4,162,520 | 7/1979 | Cook | 364/200 |
| 4,189,769 | 2/1980 | Cook | 364/200 |
| 4,220,997 | 9/1980 | Hager | 364/900 |
| 4,280,193 | 7/1981 | Baun | 364/900 |
| 4,313,162 | 1/1982 | Baun | 364/200 |
| 4,322,792 | 3/1982 | Baun | 364/200 |
| 4,435,762 | 3/1984 | Milligan | 364/200 |
| 4,463,443 | 7/1984 | Frankel | 364/900 |

Primary Examiner—Harvey E. Springborn
Assistant Examiner—Florin Munteanu
Attorney, Agent, or Firm—Alfred W. Kozak; Nathan Cass; Kevin R. Peterson

[57] ABSTRACT

A data transfer system for transferring data from magnetic tape peripheral units to a peripheral-controller for temporary storage and subsequent transfer to a host computer. A tape control unit, connected to the magnetic tape peripheral units, provides clock signals to a synchronization logic circuit which controls the transfer of data through two sequential latching registers to a buffer memory in the peripheral-controller. The two sequential latching registers function as a buffering delay element together with an automatic read logic unit which allows the read logic unit to use a lesser number of cycle-steal times than would ordinarily be required, while still controlling a steady uninterrupted flow of data words.

15 Claims, 16 Drawing Figures

FIG.2. (CFE CARD)

FIG. 3A (PDB CARD 1.)

FIG. 3B. (PDB CARD 1.)
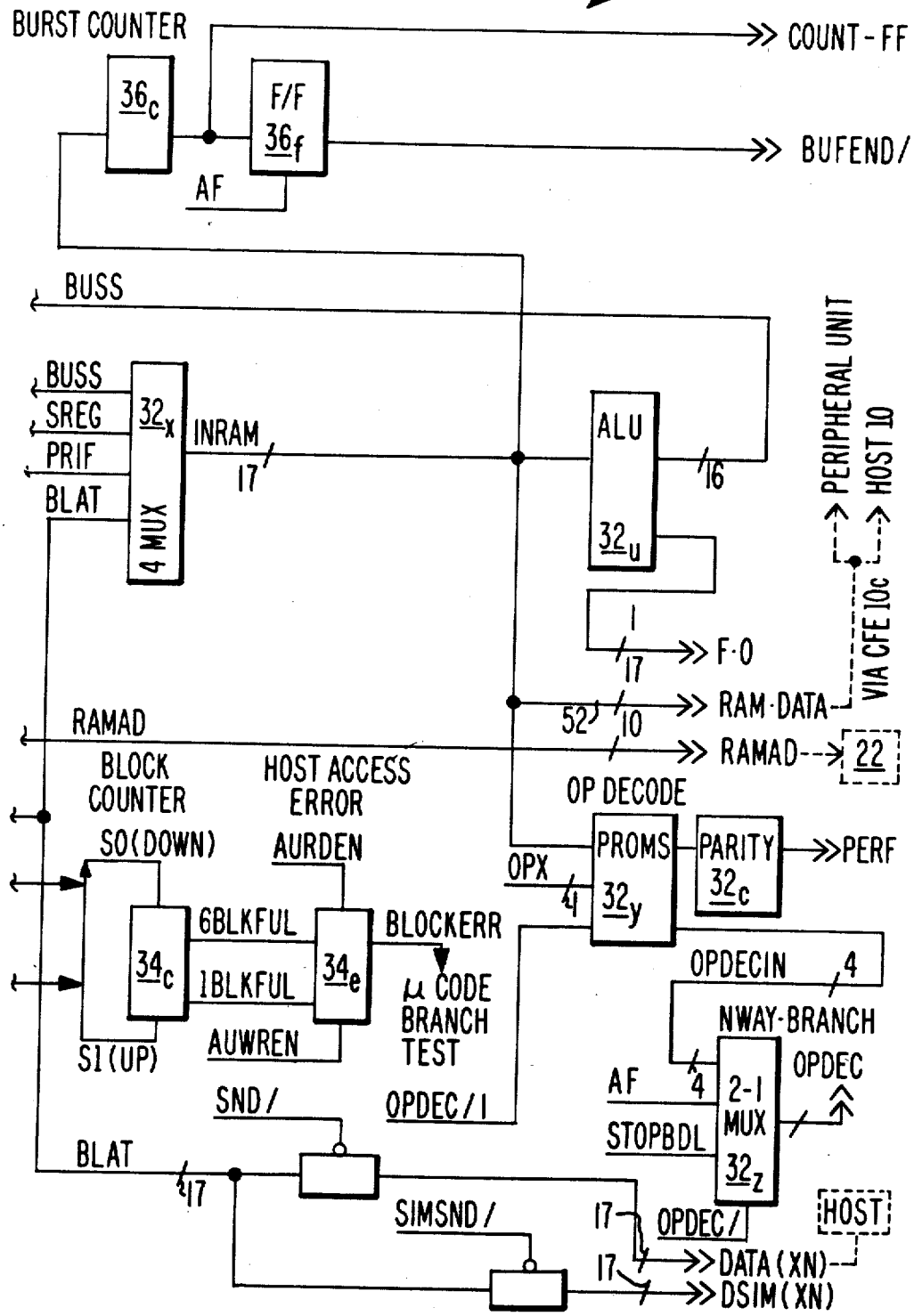

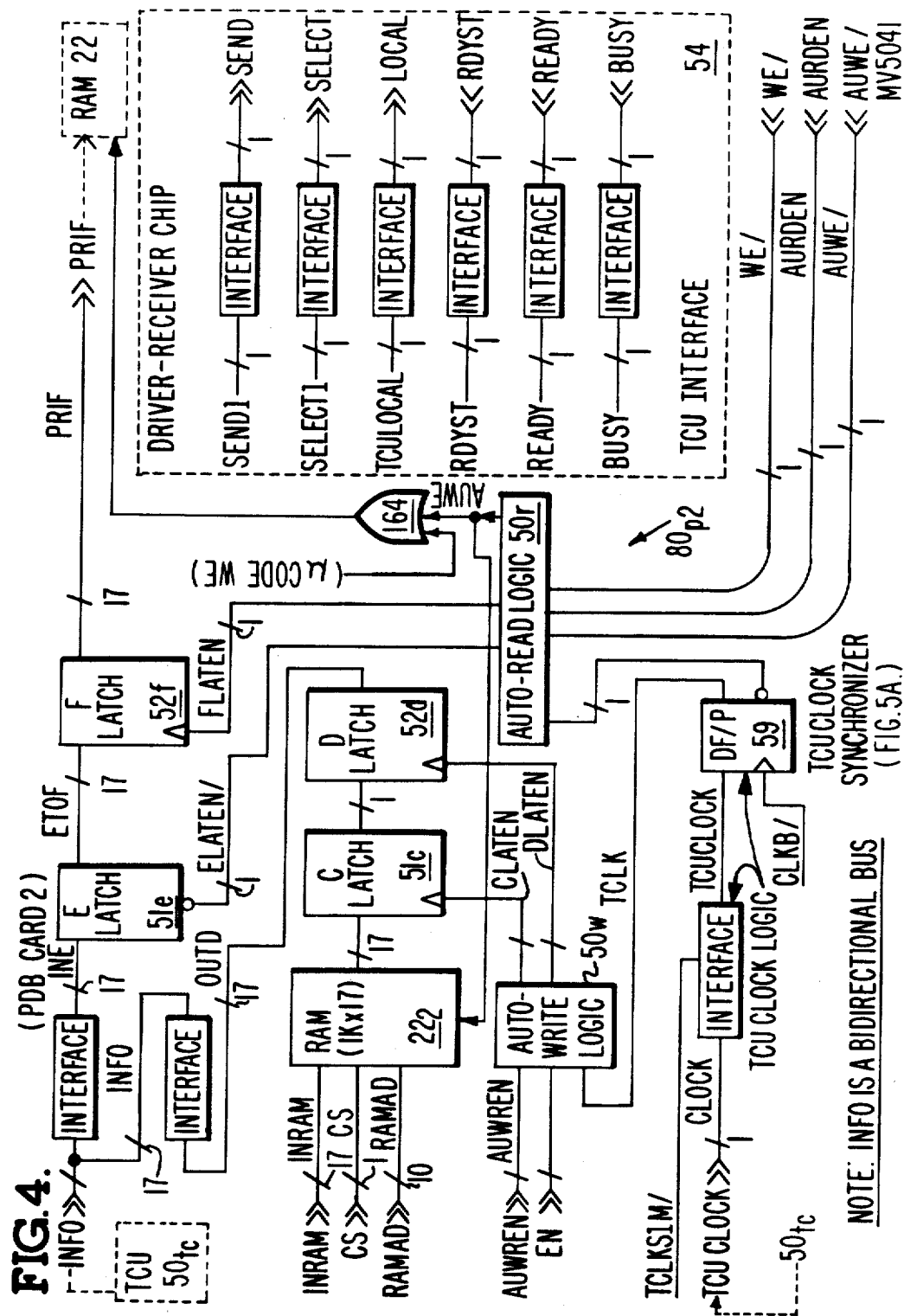

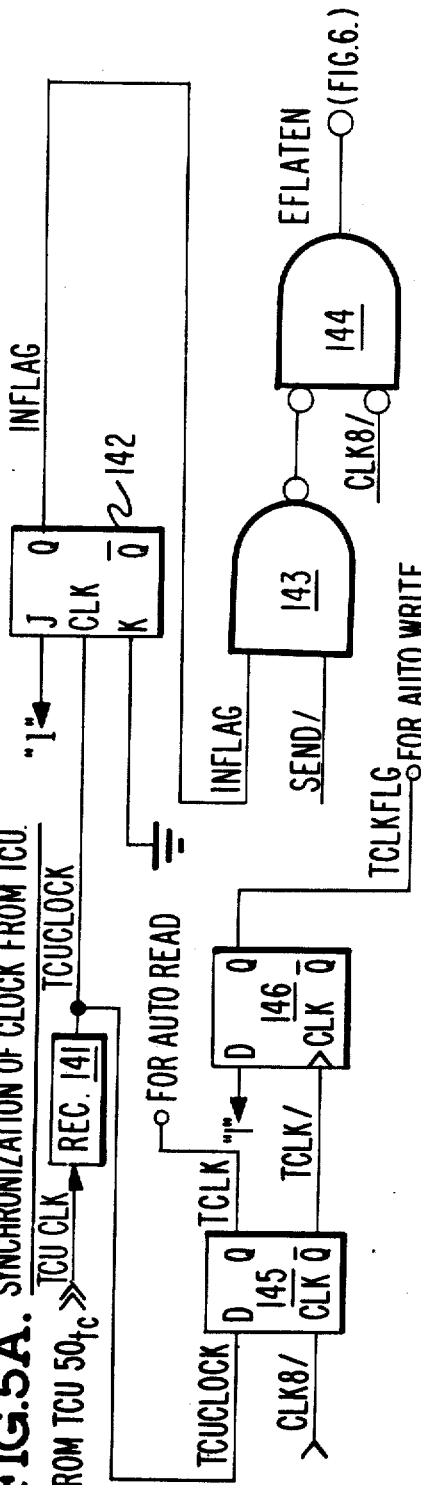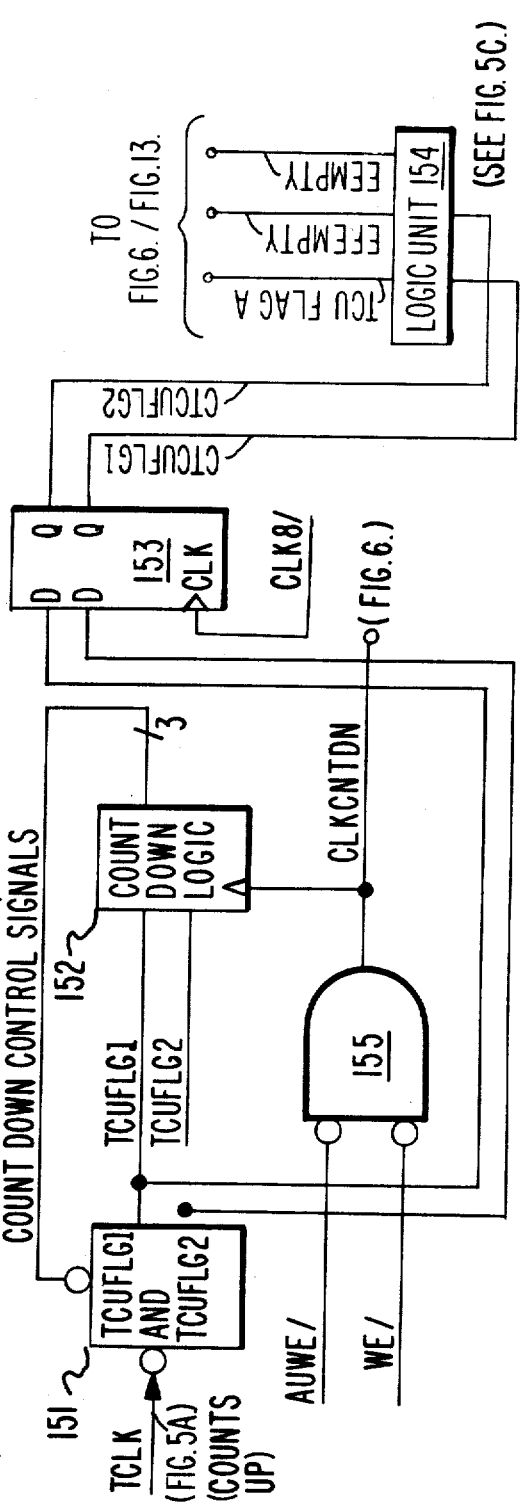
FIG.5A. SYNCHRONIZATION OF CLOCK FROM TCU.
FIG.5B. TCU FLAGS FOR AUTO READ ($50_r$) COUNT DOWN CONTROL SIGNALS

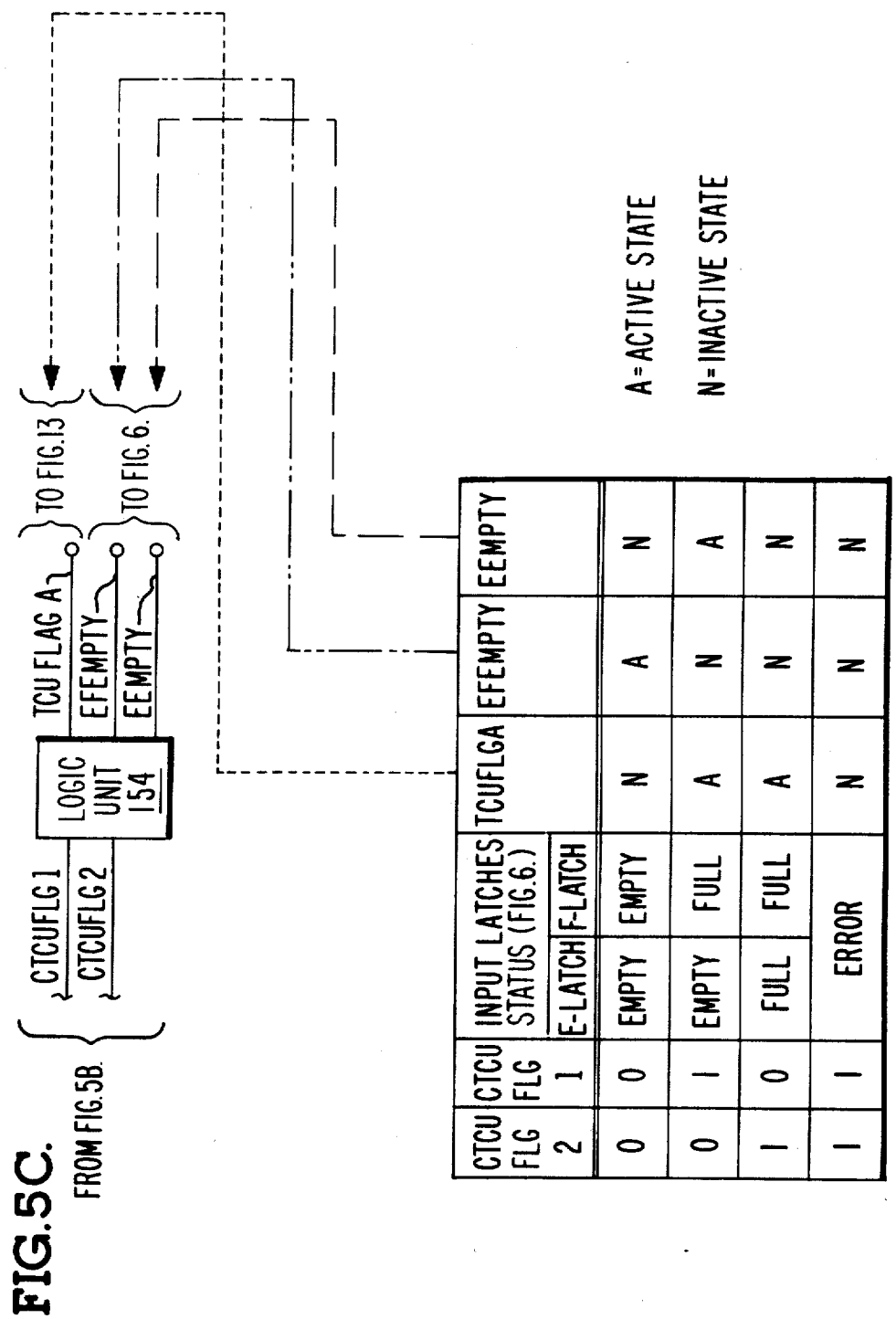

FIG.6. LATCHING LOGIC FOR AUTO READ (50r2)

INFLAG ⁎ SEND/ = EFLATEN — (LATCH ENABLE FOR LATCHES E AND F)
EFLATEN MEANS READ OPERATION (⁎) & RECEIPT OF DATA STROBE (CLOCK) FROM THE TCU (PERIPHERAL)
WHERE ⁎ = AND OPERATOR

FIG. 12.
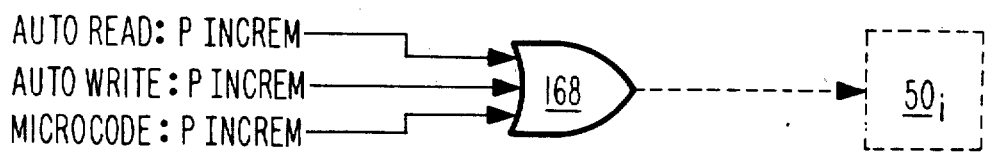
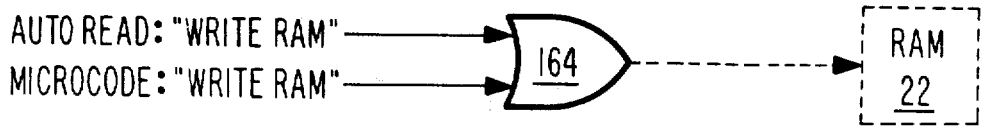
FIG. 13.
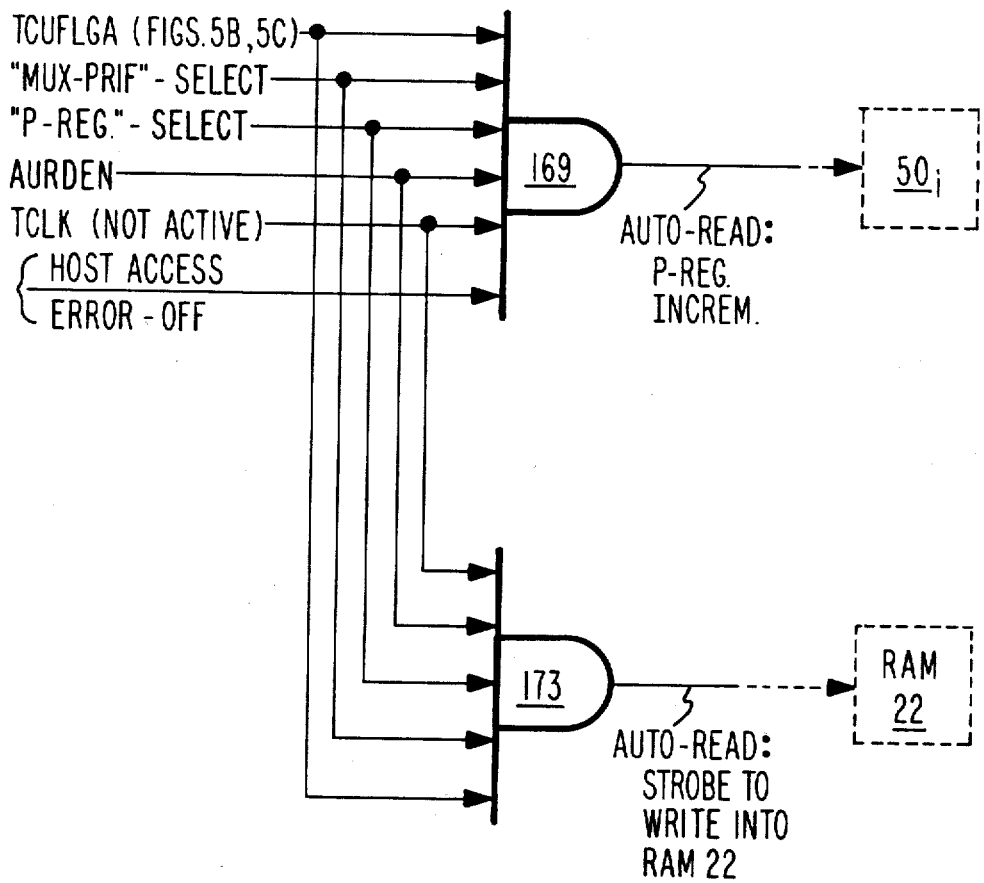

TRANSFER RATE CONTROL SYSTEM FROM TAPE PERIPHERAL TO BUFFER MEMORY OF PERIPHERAL CONTROLLER

This application is a continuation-in-part of application Ser. No. 470,377 filed Feb. 28, 1983, now abandoned.

FIELD OF THE INVENTION

This invention is related to systems where data transfers are effectuated between magnetic tape peripheral terminal units and a main host computer wherein an intermediate I/O subsystem involving a peripheral-controller is used to perform the housekeeping duties of the data transfer.

BACKGROUND OF THE INVENTION

A continuing area of developing technology involves the transfer of data between a main host computer system and one or more peripheral terminal units. To this end, there has been developed I/O subsystems which are used to relieve the monitoring and housekeeping problems of the main host computer and to assume the burden of controlling a peripheral terminal unit and to monitor control of data transfer operations which occur between the peripheral terminal unit and the main host computer system.

A particular embodiment of such an I/O subsystem has been developed which uses peripheral controllers known as "data link processors" whereby initiating commands from the main host computer are forwarded to a peripheral-controller which manages the data transfer operations with one or more peripheral units. In these systems the main host computer also provides a "data link word" which identifies each task that has been initiated for the peripheral-controller. After the completion of a task, the peripheral-controller will notify the main host system with a result/descriptor word as to the completion, incompletion or problem involved in the particular task.

These types of peripheral-controllers have been described in a number of patents issued to the assignee of the present disclosure and these patents are included herein by reference as follows:

U.S. Pat. No. 4,106,092 issued Aug. 8, 1978, entitled "Interface System Providing Interfaces to Central Processing Unit and Modular Processor-Controllers for an Input-Output Subsystem", inventor D. A. Millers, II.

U.S. Pat. No. 4,074,352 issued Feb. 14, 1978, entitled "Modular Block Unit for Input-Output Subsystem", inventors D. J. Cook and D. A. Millers, II.

U.S. Pat. No. 4,162,520 issued July 24, 1979, entitled "Intelligent Input-Output Interface Control Unit for Input-Output Subsystem", inventors D. J. Cook and D. A. Millers, II.

U.S. Pat. No. 4,189,769 issued Feb. 19, 1980, entitled "Input-Output Subsystem for Digital Data Processing System", inventors D. J. Cook and D. A. Millers, II.

U.S. Pat. No. 4,280,193 issued July 21, 1981, entitled "Data Link Processor for Magnetic Tape Data Transfer System", inventors K. W. Baun and J. G. Saunders.

U.S. Pat. No. 4,313,162 issued Jan. 26, 1982, entitled "I/O Subsystem Using Data Link Processors", inventors K. W. Baun and D. A. Millers, II.

U.S. Pat. No. 4,322,792 issued Mar. 30, 1982, entitled "Common Front-End Control for a Peripheral Controller Connected to a Computer", inventor K. W. Baun.

The above patents, which are included herein by reference, provide a background understanding of the use of the type of peripheral-controllers known as "data link processors", DLP, used in a data transfer network between a main host computer and peripheral terminal unit.

In the above mentioned Baun patent, there was described a peripheral-controller which was built of modular components consisting of a common front end control circuit which was of a universal nature for all types of peripheral controllers and which was connected with a peripheral dependent board circuit. The peripheral dependent circuit was particularized to handle the idiosyncrasies of specific peripheral terminal units.

The present disclosure likewise uses a peripheral-controller (data link processor) which follows the general pattern of the above described system, in that the peripheral-controller uses a common control circuit or common front end which works in coordination with a peripheral dependent circuit which is particularly suited to handle a specific type of peripheral terminal unit, such as a Tape Control Unit (TCU) which connects to one or more magnetic tape peripheral units.

CROSS REFERENCES TO RELATED INVENTIONS

This disclosure relates to the following patent applications:

"Block Counter System to Monitor Data Transfers", inventor J. V. Sheth, filed Nov. 16, 1982 as U.S. Ser. No. 442,159, now abandoned.

"System for Regulating Data Transfer Operations", inventors G. Hotchkin, J. V. Sheth and D. J. Mortensen, filed Dec. 7, 1982 as U.S. Ser. No. 447,389.

"Burst Mode Data Block Transfer System", inventors J. V. Sheth and D. J. Mortensen, filed Jan. 11, 1983 as U.S. Ser. No. 457,178, now U.S. Pat. No. 4,542,457.

SUMMARY OF THE INVENTION

The present invention involves a data transfer network wherein a peripheral-controller known as a data link processor is used to manage and control data transfer operations between a peripheral such as a magnetic tape unit (via a tape control unit) and the main host computer system, whereby data is transferred rapidly in large blocks, such as a block of 256 words.

The data link processor provides a RAM buffer memory means for temporary storage of data being transferred between peripheral and host system. In this case, the RAM buffer is capable of holding at least six blocks or units of data, each of which consists of 256 words, each word being of 16 bits.

In order to facilitate and control those activities in which (a) data is sometimes being "shifted into" the RAM buffer memory means from either the peripheral unit or from the main host computer and (b) the data in the RAM buffer memory is being "shifted out" either to the magnetic tape unit peripherals, for example, or to the main host computer, it is necessary that the peripheral-controller and the system have data which informs it of the condition of the RAM buffer memory means with regard to the amount of data residing therein at any given period of time.

Thus, there is disclosed a system for regulating data transfer operations between host and peripheral whereby a peripheral-controller senses blocks of data stored in its RAM buffer in order to choose routines for data transfer appropriate to the data condition of the RAM buffer. The peripheral-controller makes use of a block counter monitoring system which will inform the peripheral-controller and the main host system of the "numerical block status" of data in the RAM buffer memory means.

In particular, the present invention disclosure is directed to the data transfer operation where data originating from a magnetic tape peripheral is read out from a peripheral tape control unit into the RAM buffer of the peripheral controller. This is accomplished by logic circuitry in the peripheral controller which receives clock synchronization signals from the tape control unit and uses them to regulate the flow of data words through two latching registers prior to transfer to the RAM buffer memory. The latching registers are controlled by the logic circuitry which includes sensing means to provide status information as to the condition (empty or full) of the two latching registers whereby the flow of data transfer can be regulated in a synchronized and orderly manner.

Thus, there is provided an automatic transfer of blocks (256 words) of data without interruption to the common front end microprocessor or the main host computer. Thus, even though data is transferred out of a tape unit at different rates of speed, this data rate is synchronized by use of a synchronizer circuit which works in combination with automatic read logic in the peripheral controller which then regulates the transfer of data through two latch registers (E latch and F latch) from whence they are transferred to a RAM buffer memory for temporary storage and subsequent transfer to the main host computer system. The automatic read logic 50, concurrently senses the condition of both the E latch and the F latch to make sure that these latches are empty and can receive data words in any given cycle. Each of the latches E and F also provide a "buffer function" in that each word being transferred is delayed by one clock in the E latch and one clock in the F latch so that extra time is thus provided to remove words from RAM buffer 22 (onto the host system) so that more memory space is available in buffer 22 when latch F is ready to shift its word content over to buffer 22.

Additionally, the delay permitted by latches E and F permits a more efficient utilization of the Auto Read Logic 50, since the Auto Read Logic operates on a "cycle-steal" system. The "buffering delay" action of latches E and F permits the Auto Read Logic to steal a transfer cycle less often (one in six clocks rather than once in two clocks) while still providing a steady uninterrupted flow of data words. Sould these E and F latches not be available to receive data, then the system will flag an error signal.

In summary, the flow of data on a Read operation from a tape unit can be automatically managed through a set of two latches over to a buffer memory. While this operation is occurring, a tape synchronizer circuit and an automatic read logic circuit operate to control the E latch and the F latch to ensure an orderly and synchronized data transfer flow from the tape unit to the RAM buffer memory 22.

Further, Automatic Read and Write control circuitry in the peripheral-controller permits rapid and automatic data transfer operations for blocks of data whereby data may be "read from" or "written into" a magnetic tape peripheral and the RAM buffer memory can simultaneously receive data for temporary storage and also output data for transfer to the host system or to a peripheral unit.

BRIEF DESCRIPTION OF THE DRAWINGS

FIG. 2 is a block diagram of the common control circuit of the peripheral-controller, also called the common front end.

FIG. 4 is a block diagram of the second circuit card of the peripheral dependent circuit of the peripheral-controller.

FIG. 5A is a circuit drawing of the circuit for synchronizing data transfer from the tape control unit to the peripheral-controller.

FIG. 5B is a logic circuit used for control of automatic Read operations for transferring data from magnetic tape units to the peripheral-controller.

FIG. 5C is a chart illustrating operation of the automatic Read logic circuit.

FIG. 6 is a circuit diagram of the latching logic for the automatic Read circuit.

FIG. 12 is a logic circuit for activating the peripheral incrementation of the block counter.

FIG. 13 is a logic circuit for enabling the reading of data into the common front end buffer during the automatic Read operation.

GENERAL SYSTEM OPERATION

Figure 1:
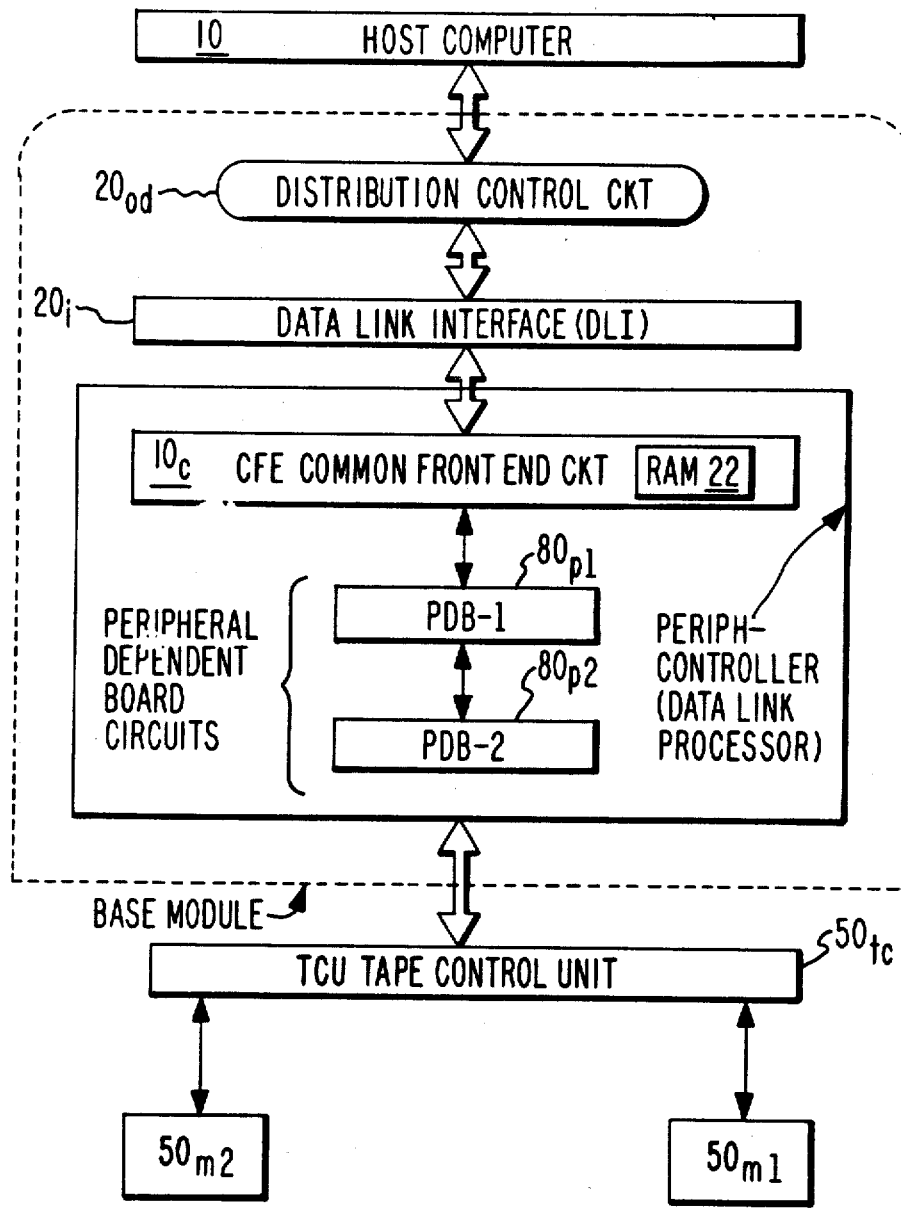
FIG. 1 is an overall system drawing of the elements involved in data transfer operations between host computer and magnetic tape peripheral terminals.

To initiate an operation, the host system 10, FIG. 1, sends the peripheral-controller (data link processor 20,) an I/O descriptor and also descriptor link words. The term "DLP" will be used to represent the Data Link Processor (peripheral-controller 20,). The I/O descriptor specifies the operation to be performed. The descriptor link contains path selection information and identifies the task to be performed, so that when a report is later sent back to the main host system 10, the main host system will be able to recognize what task was involved. After receipt of the I/O descriptor link, the data link processor (DLP) makes a transition to one of the following message level interface states.

(a) Result Descriptor: This state transition indicates that the data link processor 20, is returning a result descriptor immediately without disconnection from the host computer 10. For example, this transition is used when the DLP detects an error in the I/O descriptor.

(b) DISCONNECT: This state transition indicates that the peripheral-controller $20_t$ which is designated as the Magnetic Tape-Data Link Processor (MT-DLP) cannot accept any more operations at this time and that the I/O descriptor and the descriptor link were received without errors. This state also indicates that data transfers or result descriptor transfers can occur.

(c) IDLE: This state transition indicates that the DLP $20_t$ can accept another legal I/O operation immediately and that the I/O descriptor and the descriptor link were received without errors.

When the operation is completed, the DLP $20_t$ returns a result descriptor indicating the status of the operation to the main host system. If the DLP detects a parity error on the I/O descriptor or the descriptor link, or if the DLP cannot recognize the I/O descriptor it received, then the DLP cannot proceed with execution of the operation. In this case, the DLP returns a one-word result descriptor to the host. In all other cases the DLP returns a two-word result descriptor.

The data link processor $20_t$ is a multiple-descriptor data link processor capable of queuing one I/O descriptor for each magnetic tape unit to which it is connected. There are certain descriptors (Test/Cancel; Test/Discontinue; and Test/ID) which are not queued, but which can be accepted at any time by the DLP. Test/Cancel and Test/Discontinue OPs are issued against a single magnetic tape unit in a queue dedicated to that peripheral unit, and require that an I/O descriptor for that particular magnetic tape unit already be present within the DLP. If an I/O descriptor is received and violates this rule, the DLP immediately returns a result descriptor to the host. This result descriptor indicates "descriptor error" and "incorrect state".

As previously discussed in the referenced patents, the MT-DLP utilizes the following status states (STC) transitions when "disconnected" from the host:

STC=3 to STC=1
IDLE to DISCONNECT indicates that the DLP is attempting to process a queued OP.

STC=1 to STC=3
DISCONNECT to IDLE indicates that the DLP is prepared to accept a new I/O descriptor.

STC=3 to STC=5
IDLE to SEND DESCRIPTOR LINK indicates that the DLP is executing an OP, and that the DLP requires access to the host computer.

STC=1 to STC=5
DISCONNECT to SEND DESCRIPTOR LINK indicates that the DLP is executing an OP, and that the DLP requires access to the host computer.

The DLP status states can be represented in a shorthand notation such as STC=n.

Upon completion of an I/O operation, the data link processor forms and sends the result descriptor to the host system. This descriptor contains information sent by the tape control unit $50_{tc}$ to the DLP in the result status word, and also information generated within the DLP. The result descriptor describes the results of the attempt to execute the operation desired.

DESCRIPTOR MANAGEMENT

All communications between the DLP $20_t$ and the host system 10 are controlled by standard DLP status states as described in the previously referenced patents. These status states enable information to be transferred in an orderly manner. When a host computer 10 connects to the DLP $20_t$, the DLP can be in one of two distinct states: (a) ready to receive a new descriptor, or (b) busy.

When in STC=3 (IDLE), the DLP can accept a new I/O descriptor. When in STC=1 (DISCONNECT) or in STC=5 (SEND DESCRIPTOR LINK), then the DLP is busy performing a previously transferred operation.

When the DLP receives an I/O descriptor and descriptor link that does not require immediate attention, the DLP stores the descriptor in its descriptor queue. The DLP is then able to receive another I/O descriptor from the host system.

When the host system 10 "Disconnects" from the DLP $20_t$ after issuing one or more queued I/O descriptors, then the DLP initiates a search of its descriptor queue. This search continues until the DLP finds an I/O descriptor that needs DLP attention, or until the host "reconnects" to send additional I/O descriptors. If the DLP finds an I/O descriptor that requires attention, and if the descriptor specifies neither a Test/Wait for Unit Available OP, nor a Test/Wait for Unit Not Available OP, then the DLP verifies that the host is still "disconnected". If these conditions are met, the DLP goes to STC=1 (DISCONNECT) and initiates execution of the descriptor. Once the DLP goes to STC=1, then no further I/O descriptors are accepted from the host until the initiated operation has been completed and a result descriptor has been returned to the host.

The DLP searches its descriptor queue on a rotational basis. The order for search is not disturbed by the receipt of one or more new I/O descriptors, nor by the execution of operations. This means that all queued entries are taken in turn regardless of DLP activity and all units have equal priority.

When cleared, the DLP halts all operations in progress with the peripherals and invalidates all the queued I/O descriptors, and returns to Status STC=3 (IDLE).

DLP-DATA BUFFERS AND DATA TRANSMISSION

The data buffer 22 (FIG. 1) of the DLP provides storage for six blocks of data which are used in a "cyclic" manner. Each of the six blocks holds a maximum of 512 bytes of data. Data is transferred to or transferred from the host blocks of data which are used in a "cyclic" system one block at a time, via the buffer 22, followed by a longitudinal parity word (LPW). Data is always transferred in full blocks (512 bytes) except for the final block of data for a particular operation. This last block can be less than the 512 bytes, as may be required by the particular operation.

Figure 2:
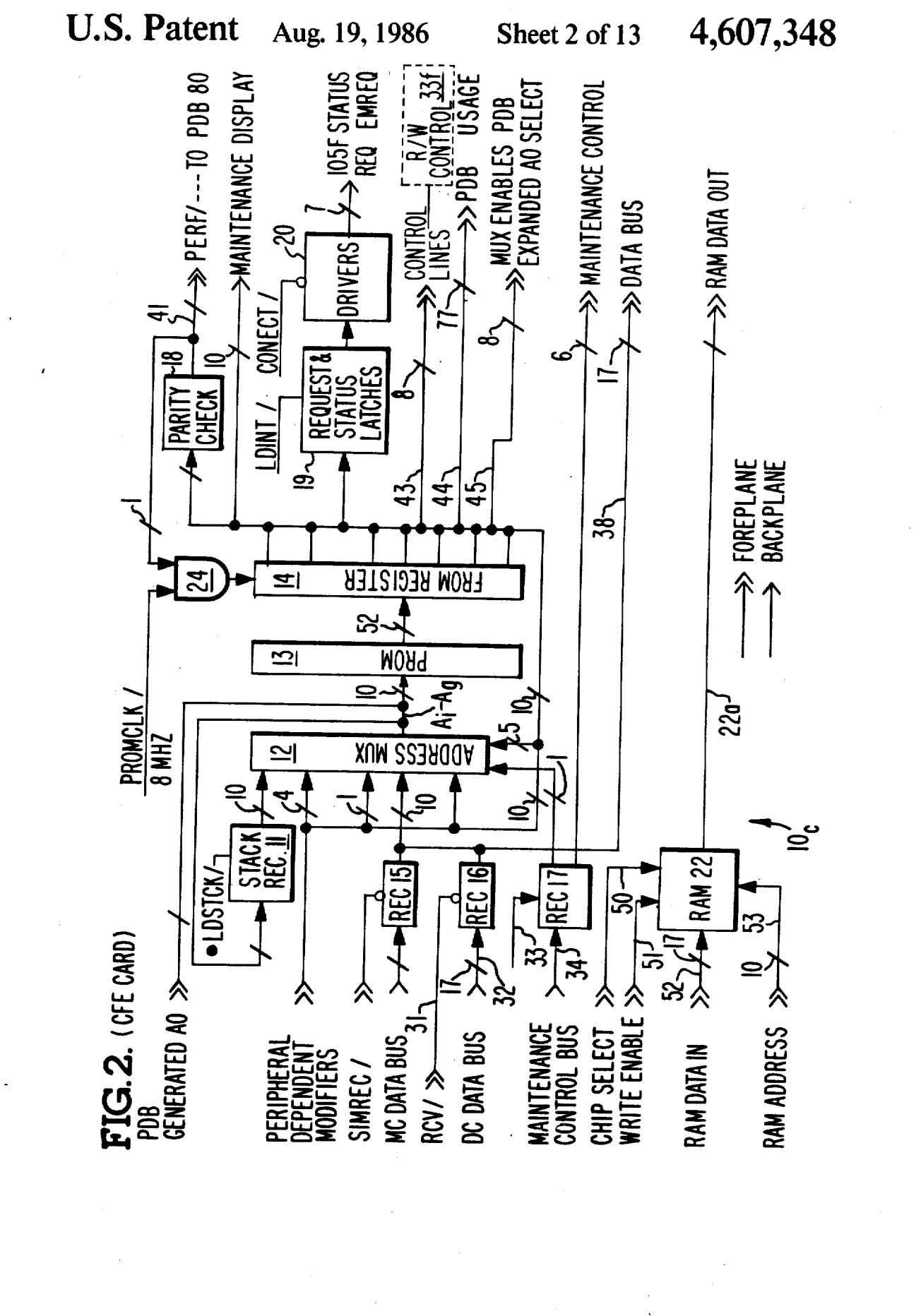
Figure 3:
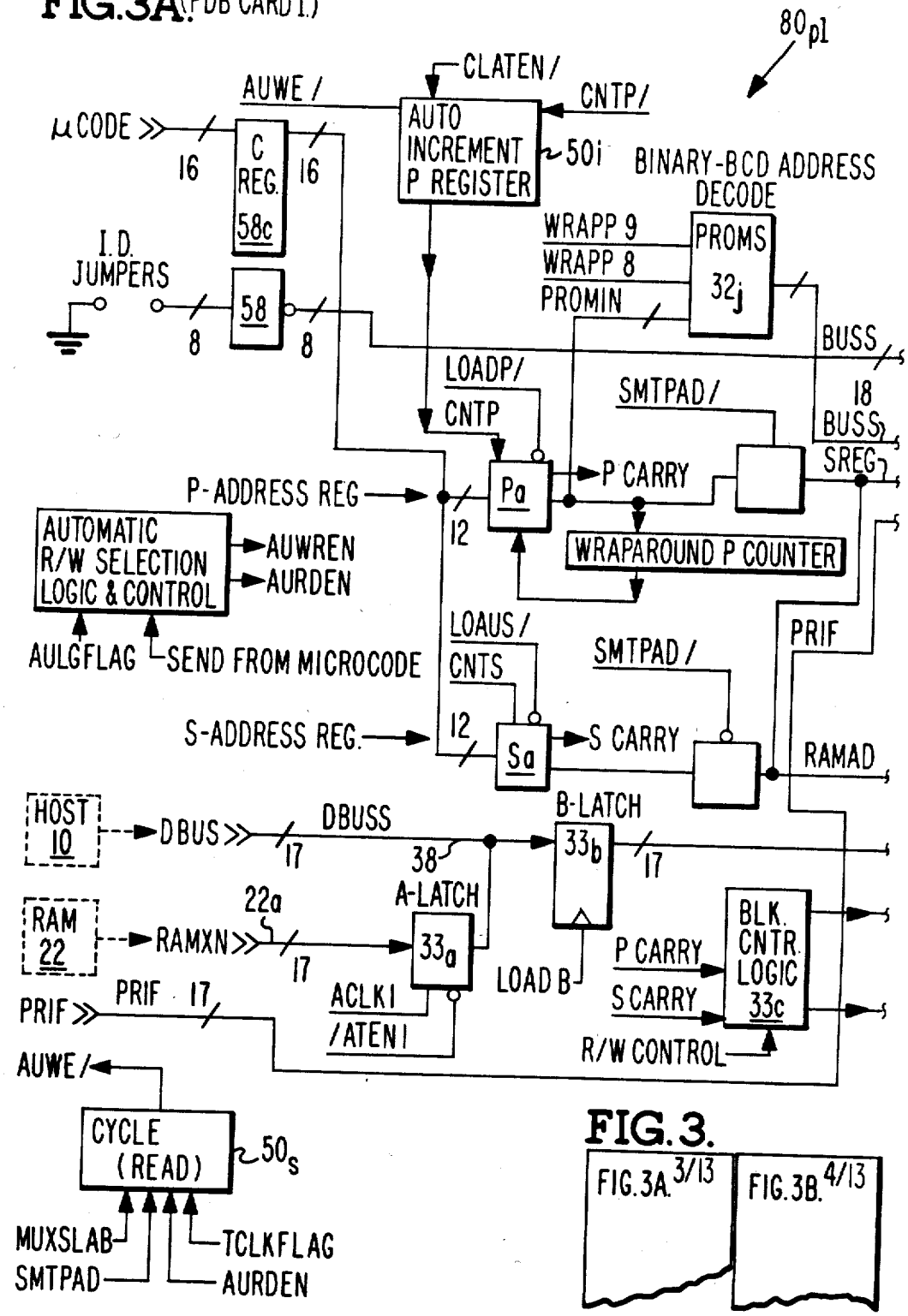
FIGS. 3A-3B is a block diagram of the first circuit card of the peripheral dependent circuit of the peripheral-controller.

As seen in FIG. 3, logic circuitry (to be described hereinafter) is used to feed information to a block counter $34_c$ which will register the number of blocks of data residing in buffer 22 at any given moment. When certain conditions occur, such as a full buffer, or empty buffer, or "n" number of blocks, the counter $34_c$ can set to trigger a flip-flop $34_e$ which will signal the common control circuit unit $10_c$ (FIG. 2) to start routines necessary to either transfer data to the host 10 (after reconnecting to the host) or to get data from the host 10 to transfer to the buffer 22 (seen in FIG. 1, and FIG. 2); or else the front end unit $10_c$, FIG. 2, can arrange to connect the DLP $20_t$ to the peripheral (as tape control unit $50_{tc}$) for receipt of data or for transmission of data.

During a Write operation, the block counter $34_c$ (FIG. 3) counts the number of blocks of data received from the host system 10. The data link processor "disconnects" from the host system once the DLP has received six buffers; or it will disconnect upon receipt of the "Terminate" command from the host system (a Terminate indicates the "end" of the Write data for that entire I/O operation). After disconnecting from the host, the data link processor connects to the peripheral tape control unit (TCU $50_{tc}$). Once proper connection is established between the data link processor and the tape subsystem, the data link processor activates logic which allows the tape control unit $50_{tc}$ a direct access to the DLP RAM buffer 22 for use in data transfers.

After the data link processor has transmitted one block of data to the tape control unit, the data link processor attempts to "reconnect" to the host system by means of a "poll request" (as long as the host 10 has not "terminated" the operation). Once this reconnection is established, the host transfers additional data to buffer 22 of the data link processor $20_{t2}$, FIG. 1. This transfer continues until either the six blocks of RAM buffer memory 22 are again full (a buffer which is in the process of being transferred to the tape control unit is considered full during this procedure), or until the host 10 sends a "Terminate" command. Data transfer operations between the data link processor $20_t$ and the tape control unit $50_{tc}$ continue simultaneously with the host data transfers occurring between host 10 and DLP $20_t$ (via the buffer 22).

If the data link processor $20_t$ has not successfully reconnected to the host before the DLP has transmitted, for example, three blocks of data to the tape control unit $50_{tc}$, the data link processor sets "emergency request" on the data link interface $20_i$, FIG. 1. If the "emergency request" is not successfully serviced before the DLP has only one block of data remaining for transmission to the tape control unit, the data link processor sets a "Block Error" condition by signal from flip-flop $34_e$ to circuit $10_c$. This is reported to the host system as a "host access error" in the result descriptor.

The last block of data for any given I/O operation is transferred to the tape control unit $50_{tc}$ directly under micro-code control. During a "Read" operation, the data link processor first attempts to connect to the tape control unit $50_{tc}$. Once a successful connection is accomplished, the data link processor initiates logic to begin accepting data from the tape subsystem. Once the data link processor has received two blocks of data (or once the DLP receives all the data from the operation if the total length is less than two blocks), the data link processor attempts to connect to the host using a "poll request". The data link processor continues to accept tape data while at the same time affecting this host connection.

If the host does not respond to the "poll request" before four blocks of data are present in the DLP RAM buffer 22, the data link processor sets "emergency request" on the data link interface $20_i$. If no connection to the host system is effectuated before all of the six RAM buffers are filled, then the data link processor sets "host access error" in the result descriptor.

Once the host system answers a "poll request", the data link processor $20_t$ starts to send data to the host system 10 (which data came from a peripheral magnetic tape unit) while at the same time continuing to receive data from the tape control unit $50_{tc}$. After the host 10, FIG. 1, has received one block of data, the data link processor checks whether or not two full blocks of data remain to be transferred to the host. If this is so, the DLP uses a "break enable". If a "break enable" request is granted, then transmission of the next data buffer to the host continues to occur. If there are less than two full blocks of data in the RAM buffer 22 (or if the "break enable" is refused), the data link processor disconnects from the host and waits for two full blocks of data to be present. If a "break enable" is refused, the data link processor initiates another "poll request" immediately after disconnection.

When the data link processor has completed data transfer, the tape control unit $50_{tc}$ enters the result phase and sends two words of result status to the data link processor $20_t$. The DLP then incorporates this information, plus any internal result flags, into the result descriptor which the DLP then sends to the host.

DESCRIPTION OF PREFERRED EMBODIMENT

Referring to FIG. 1, the overall system diagram is shown whereby a host computer 10 is connected through an I/O subsystem to a peripheral unit, here, for illustrative purposes, shown as a tape control unit $50_{tc}$. This tape control unit (TCU) is used to manage connection to a plurality of Magnetic Tape Unit (MTU) peripherals. As per previous descriptions in the above cited patents which were included by reference, the I/O subsystem may consist of a base module which supports one or more various types of peripheral-controllers, in addition to other connection and distribution circuitry such as the distribution control circuit $20_{od}$ and the data link interface $20_i$. The peripheral-controller $20_t$ is shown in modular form as being composed of a common front end circuit $10_c$ and a peripheral dependent circuit shown, in this case, as being composed of two peripheral dependent boards designated $80_{p1}$ and $80_{p2}$.

In this network situation, it is often desired that data from the main host computer be transferred on to a peripheral unit, such as a magnetic tape unit, for recording on tape. This would be done via a peripheral tape control unit TCU such as $50_{tc}$. Likewise, at times it is desired that data from the magnetic tape unit be passed through the tape control unit to be read out by the host computer. Thus, data is transferred in a bidirectional sense, that is, in two directions at various times in the activities of the network.

The key monitoring and control unit is the data link processor $20_t$ which when initiated by specific commands of the host computer will arrange for the transfer of the desired data in the desired direction.

The RAM buffer 22 (of FIGS. 1, 2) is used for temporary storage of data being transferred between peripherals and the main host computer. In the preferred embodiment this RAM buffer has the capability of storing at least six "blocks" of data, each block of which consists of 256 words.

The Magnetic Tape Data Link Processor (MT-DLP) consists of three standard 96-chip multi-layered printed circuit cards that plug into adjacent slots in the backplane of the base module (FIG. 1). The base module for this system has been previously described in U.S. Pat. No. 4,322,792 previously referenced patents.

The common front end card $10_c$ (FIGS. 1, 2) contains:
(a) The master control logic;
(b) 1K×17-bit RAM words;
(c) 1K×49-bit microcode PROM words which sequence and control the operation of the DLP;

(d) The interface receivers from the distribution card $20_{od}$ and from a maintenance card in the base module.

In addition to the common front end card $10_c$ there are two PDBs or peripheral dependent boards. These are designated PDB/1 and PDB/2 and are shown on FIGS. 3 and 4. These PDBs provide control signals and the interface to the magnetic tape subsystem.

The PDB/1 card contains:
(a) The System and Peripheral RAM Address Registers;
(b) The Binary-BCD Address Decode PROMs;
(c) Op Decode PROMs;
(d) N-Way Microcode Branch Logic;
(e) Burst Counter;
(f) Block Counter;
(g) Host Access Error Logic;
(h) Arithmetic Logic Unit (ALU).

The second peripheral dependent board card designated PDB/2 contains the following:
(a) The Auto Read Logic;
(b) Auto-Write Logic;
(c) Input (Read) and Output (Write) Latches;
(d) A 1K×17-bit RAM buffer extension of the Common Front End RAM 22;
(e) Clock Logic for the Tape Control Unit $50_{tc}$;
(f) Interface Logic for the Tape Control Unit $50_{tc}$.

As discussed in the previously referenced patents, each card in the peripheral-controller (Data Link Processor) has "foreplane" connectors through which frontplane cables can interconnect these cards. The cards are slide-in cards which connect at the backplane connectors into the base module. The top two foreplane connectors of all three cards of the DLP are interconnected by means of three-connector, 50-pin foreplane jumper cables. The common front end is connected to the first board, PDB/1, via connector and cable and the board PDB/1 is connected to the second board, PDB/2, via another connector and cable. This is done by means of two-connector, 50-pin foreplane jumper cables. From the connector on the second board PDB/2, there is a 50-conductor cable which is connected to an interface card which plugs into an interface panel board. Connections to the tape subsystem TCU $50_{tc}$ is made from this interface panel board.

COMMON FRONT END CARD (CFE 10c)

In FIG. 2 there is seen a basic block diagram of the common front end card which has previously been described in U.S. Pat. No. 4,322,792 entitled "Common Front End Control for a Peripheral Controller Connected to a Computer", inventor Kenneth W. Baun. The most significant item of the common front end card designated as $10_c$ in FIG. 2 is the PROM 13 which is a 1K×52-bit word memory. Only 49 (including odd parity bits) of the 52 bits are used. The last three bits are not used or checked for parity.

PROM 13 consists of 13 PROM chips of 1K×4-bit chips which are connected in parallel to form the 1K×52-bit PROM. The contents of these PROMs 13 are called the microcode which controls all of the DLP functions. The microcode address lines, designated A0-A9, are wired in parallel to all 13 chips. The eight megahertz clock (PROMCLK/) latches the next 52-bit microcode word output from the PROM 13 into the microcode register 14.

The common front end card $10_c$ contains logic which generates the address for the microcode PROMs. Also, certain component terms in this logic are further generated on the peripheral dependent boards. The CFE $10_c$ has a stack register 11 composed of three binary counter chips. This register contains the value of the current PROM address or the subroutine return address for a stacked branch operation.

Seventeen 1K×1-bit RAM chips are connected in parallel to make up the random access buffer memory 22 on the common front end card $10_c$. This RAM 22 is made of 1K×17-bits. The Write Enable, the Chip Select, and the 10 RAM address lines are generated on the first PDB card $80_{p1}$, FIG. 1, and these address lines are routed in parallel to all of the RAM chips on the CFE $10_c$.

An additional 1K×17-bit RAM buffer memory $22_2$ is provided on the PDB/2 card $80_{p2}$, FIG. 1. Thus, the RAM buffer memory is 2K words deep. The same Write Enable, Chip Select and RAM address lines that feed the RAM 22 also feed the RAM $22_2$ on the second board PDB/2. A "low" signal chip select is used to select the RAM 22.

The "high" chip select signal selects the extended buffer RAM $22_2$ on PDB/2. All the data inputs and data outputs to the RAM buffer memories are sourced, sunk and controlled by the peripheral dependent boards PDB/1 and PDB/2.

The common front end $10_c$ also contains much of the logic for the hostward DLP interfaces. The "interface" to the distribution card $20_{od}$ and a path selection module is called the Data Link Interface (DLI) shown as $20_i$ on FIG. 1. The common front end $10_c$ contains the drivers and receivers for the control line on the DLI. The common front end card also contains the receivers for the bi-directional DLI data bus (DATAxx/O). The drivers and the directional controls for this particular bus are located on the first PDB card PDB/1.

The common front end card contains the receivers and control logic which enables connection to a maintenance card in the base module, and which governs test diagnostics for the data link processor. The CFE $10_c$ also contains the receivers for the 17-bit bi-directional data simulation bus (DSIMxx/O). This bus provides both data simulation and microcode PROM address override when used in the "maintenance mode". The drivers for this bus are located on the PDB/1 card. The CFE $10_c$ also contain some of the maintenance display logic used in DLP diagnostic routines.

The maintenance interface line (SWH.1/.0) is used to override the microcode PROM address. When the DLP is connected to the maintenance card, and when this line is "low", the DSIMxx/0 lines provide the microcode addresses. This permits the verification of the contents of the microcode, and also allows special microcode words to be used to govern DLP action during diagnostics.

PERIPHERAL DEPENDENT CIRCUITRY

The primary function of the peripheral dependent boards PDB/1, PDB/2 is to provide the interface to the peripheral tape subsystem which is controlled by tape control unit $50_{tc}$, FIG. 1. FIG. 3 is a functional block diagram of the first PDB card designated PDB/1. FIG. 3 shows the first PDB card containing addressing lines, data path lines and data path control for the DLP RAM 22 (FIG. 2) and $22_2$ (FIG. 4), the arithmetic logic unit $32_u$ (ALU) for the DLP, in addition to longitudinal and vertical parity generation and checking logic, microcode branching and control decode logic, peripheral data block counting and a binary-BCD converter.

Two twelve-bit address registers $P_a$ and $S_a$ are used to store RAM addresses. The system address register ($S_a$) is used when the MT-DLP is communicating with the host 10, and the peripheral address register ($P_a$) is used when the data link processor is communicating with the tape control unit, TCU $50_{tc}$. Ten-bits are needed to address the RAM (22 or $22_2$). Bit number 9 is the RAM chip select. When this bit is low, the RAM on the common front end card $10_c$ is addressed (RAM 22). When the chip select line is "high", the RAM $22_2$ on the second PDB card PDB/2 is addressed. Bit 10 of the address register provides function control. Both of these registers are addressed by the common front end microcode through the constant register designated C-register, $58_c$, FIG. 3.

The arithmetic logic unit $32_u$ (ALU), FIG. 3, is comprised of four 4-bit bi-polar-bit-slice microprocessors cascaded to form one 16-bit processor. The ALU contains sixteen 16-bit internal registers which can be loaded by the CFE microcode (from $10_c$) for both arithmetic and Boolean operations. Nine bits of microcode are used to control the ALU 32.

The ALU 32 receives input data from a 4×1 multiplexor $32_x$ (MUX). The same multiplexor $32_x$ also forms the data input 52 to the DLP RAM buffer 22 on the line labelled RAM-DATA of FIG. 3.

The data path on the PDB/1 card of FIG. 3 consists of two latches, $33_a$ and $33_b$. The A-latch $33_a$ of FIG. 3 receives the RAM buffer 22 output data. The B-latch $33_b$ receives data from the A-latch, from the common front end DLI receivers or else from the common front end DSIM bus receivers. B-latch receives these inputs on line 38 of FIG. 3. The B-latch outputs are fed to the 4×1 multiplexor $32_x$ and then to the ALU $32_u$ or else to the RAM buffer 22, or to the DLI data bus (DATAxx/0), or to the MI data simulation bus (DSIMxx/0). The drivers for these last two interfaces are located on the first PDB card designated PDB/1.

The block counter $34_c$ of FIG. 3 keeps track of the number of data blocks available for transfer or for acceptance with the host system and with the tape subsystem, $50_{tc}$.

BURST MODE

The MT-DLP has capabilities of utilizing a burst mode data transfer mode wherein data can be transferred to the host system at the maximum DLI rate of 64 megabits per second (depending upon the speed capability of the host system). When in the burst mode, the 8-bit burst counter $36_c$, FIG. 3, maintains a count of the number of words remaining to be transferred between the host and the data link processor during the burst transfer cycle.

A converter $32_p$, FIG. 3, designated Binary-to-BCD converter which uses binary address decode logic, converts binary data from the host system into binary-coded-decimal (BCD) data for use of the peripheral tape subsystem.

FIG. 4 shows a block diagram of the second peripheral dependent board designated PDB/2. This card contains an extension RAM $22_2$ of the RAM memory 22 (which is located on the CFE card $10_c$). The RAM memory extension on the second PDB card is designated as $22_2$ and contains a 1K×17-bit memory area. Particularly significant on the card PDB/2 is the logic designated as the Auto Read Logic $50_r$ and the Auto Write Logic $50_w$. In addition, the second peripheral dependent board card includes input latches $51_e$ and $51c$ and output latches $52_f$ and $52_d$. A clock-strobe (proportional to tape speed) signal from peripheral $50_{tc}$ (TCU clock) feeds to a peripheral synchronizing clock circuit 59 for the peripheral subsystem (PRIF), and to the interface 54 (driver-receiver) which connects to the tape control unit TCU $50_{tc}$. This interface 54 contains drivers and receivers for the various control signal lines between the PDB/2 card and the tape control unit $50_{tc}$.

The extended RAM memory 222 on PDB/2 (FIG. 4) is a 1K×17-bit memory which uses the same address lines and the same "write enable" as the common front end RAM buffer memory 22. A "high" chip select signal selects the extended RAM $22_2$, as previously discussed.

Unique to the magnetic tape data link processor is the logic known as the auto-write and auto-read logic ($50_w$, $50_r$). After being initialized and enabled, this logic is capable of transferring data to or from the tape control unit or independently from any further microcode control from the CFE $10_c$. Thus, the MT-Data Link Processor can "simultaneously" transfer data on both the Data Link Interface $20_i$ with the host 10 and at the same time, transfer data on the peripheral interface with the tape control unit.

During a "Write" operation, the block counter $34_c$ (FIG. 3) counts the number of blocks of data received from the host system 10. The data link processor disconnects from the host system once the DLP has received six buffers; or upon receipt of the "Terminate" command from the host system (a "terminate" indicates the end of the Write data for that entire I/O operation). After disconnecting from the host, the data link processor $20_t$, FIG. 1, connects to the peripheral tape control unit $50_{tc}$. Once proper connection is established between the data link processor and the tape subsystem, the data link processor activates the Auto-Write logic. This allows the tape control unit a direct access to the DLP RAM buffer 22 or $22_2$ for use in data transfer to $50_{tc}$.

After the data link processor has transmitted one block (256 words) of data to the tape control unit, the data link processor attempts to "re-connect" to the host system by means of a "poll request". Once this re-connection is established, the host transfers additional data to the buffer 22 of the data link processor. This transfer continues until either the six blocks of RAM buffer memory are again full (a buffer which is in the process of being transferred to the tape control unit is considered full during this procedure), or until the host sends a "terminate" command. Data transfer between the data link processor and the tape control unit "$50_{tc}$ continues simultaneously with the host data transfers to buffer 22. Thus, while the DLP $20_t$ is re-establishing the connection with the host system 10, the Auto Write Logic $50_w$ is transferring data from the buffer memory 22 over to the tape control unit $50_{tc}$.

If the MT-data link processor has not successfully reconnected to the host before the DLP has transmitted three blocks of data to the tape control unit, the data link processor sets "emergency request" on the data link interface $20_i$ (DLI). If the "emergency request" is not successfully serviced before the DLP buffer 22 has only one block of data remaining for transmission to the tape control unit, the data link processor sets a "Block Error" condition via $34_e$ of FIG. 3. This is reported to the host system as a "host access error" in the result descriptor.

The last remaining block of data for any given I/O operation is transferred to the tape control unit $50_{tc}$ directly under microcode control of the common front end $10_c$. This is called a "demand mode" rather than the previously described "burst mode". Here the Auto-Write logic is not used for transfer of the last data block. During a "Read" operation, the MT-data link processor first attempts to connect to the tape control unit $50_{tc}$. Once a successful connection is accomplished, the data link processor initiates the "Auto-Read Logic" $50_r$, and begins accepting data from the tape subsystem. Once the data link processor buffer 22 has received two blocks of data (or once the DLP receives all the data from the operation if the total length is less than 2-blocks) the data link processor attempts to connect to the host 10 using a "poll request". The data link processor continues to accept tape data while at the same time affecting this host connection.

If the host does not respond to the "poll request" before four blocks of data are present in the DLP RAM buffer 22, the data link processor sets "emergency request" on the data link interface (DLI). If no connection to the host system is effectuated before all of the six RAM buffers are filled, then the data link processor sets "host access error" in the result descriptor. This means that the peripheral data has "over filled" the buffer 22 before the host 10 could manage to remove or sufficiently clear the data in the buffer 22.

Once the host system answers a "poll request", the data link processor $20_t$ starts to send data to the host system while at the same time, continuing to receive data from the tape control unit $50_{tc}$ under control of the Auto-Read Logic $50_r$. Thus, on a read operation, while the buffer 22 is being "emptied" of data by transfer to host system 10, it is simultaneously being "filled" by operation of the Auto Read Logic $50_r$ which is transferring data from the peripheral tape unit to buffer 22. After the host 10 has received one block of data, the data link processor checks whether or not two full blocks of data remain to be transferred to the host. If this is so, the DLP uses a "break enable". If a break enable request is granted by the host, then transmission of the next data buffer to the host continues to occur. If there are less than two full blocks of data in the RAM buffer 22 (or if the "break enable" is refused), the data link processor disconnects from the host and waits for two full blocks of data to be present. If a "break enable" is refused, the data link processor initiates a "poll request" immediately after disconnection.

In the normal situation when there are more than two blocks of data to be transferred to the host system, the DLP sets the "burst counter" $36_c$ to 256 (words) and sends blocks of data to the host in the burst mode. When there are less than two blocks of data remaining to complete the I/O operation, the DLP calculates the actual length of the remaining data by comparing the P-register and S-register. The data link processor determines whether the remaining number of bytes is "odd" or is "even". If odd, the final byte is the PAD byte (all zeros inserted by the DLP). The final two blocks, whether partial or full, are sent to the host using a "demand" mode on a word by word transfer basis, where the processor in $10_c$ will instruct each word transfer individually rather than automatically as in the burst mode.

When the data link processor has completed data transfer, the tape control unit enters a "Result Phase" and sends two words of result status to the data link processor. The DLP then incorporates this information, plus any internal result flags, into the result descriptor which the DLP $20_t$ then sends to the host 10.

Referring to FIG. 3, a block counter logic unit $33_c$ is used to receive input from two address registers designated as the peripheral address register, $P_a$, and the system address register, $S_a$. The peripheral address register, $P_a$, handles addresses required when data is retrieved from the peripheral tape unit or when data is being sent to the peripheral tape unit. The system address register, $S_a$, is used when data is being received from the host system into the buffer 22 or when data is being sent to the host system from the buffer 22. These two address registers in FIG. 3 are seen to receive their address data via microcode signals from the common front end circuit $10_c$ of FIG. 1.

The address data outputs from $P_a$ and $S_a$ are fed to the RAM buffer 22 in order to address the desired location in the buffer memory. Further, the block counter logic unit $33_c$ (FIG. 3) receives one input designated "P Carry" from the peripheral address register and another input "S Carry" from the system address register, in addition to a Read/Write control signal from read-write flip-flop $33_f$. The flip-flop $33_f$ is controlled by microcode signals from the control lines 43 (of FIG. 2) of peripheral-controller common front end unit $10_c$. The block counter logic unit $33_c$, FIG. 3, provides two output signals designated $S_1$ and $S_0$ which are fed to the block counter $34_c$ where the output signals $S_1$ and $S_0$ are combined at certain times on occurrence of rising clock signals in order to provide conditions which will make the block counter either "shift up" or "shift down" or "no shift".

The block counter $34_c$ will reflect the situation that when data is being taken out of the magnetic tape unit in order to be fed to RAM buffer 22 ("Read" operation), the block counter will shift up unless at the same time there is data being removed from buffer 22 for transfer to the main host computer system in which case the block counter $34_c$ will shift down. Thus, the condition of the block counter's numerical status will indicate the "balance" between what data has gone out of and what data has come into the RAM buffer 22.

Referring to FIG. 3, if there is a "Write" operation, this determines that data is to be "written" into the magnetic tape unit. Then, as data is removed from the RAM buffer 22 over to the magnetic tape unit, the block counter $34_c$ will shift down but if more data is transferred from the main host computer into the RAM buffer 22, the block counter will be shifted up. Thus, again the placement of "ones" in various bit positions of $34_c$ provides a running balance of the data blocks taken out as against the data blocks taken in at any given period.

The condition known as the "host access error" causes the setting of a flip-flop $34_e$, FIG. 3. (This is also called a block counter error). Thus, on a Read operation, a full RAM buffer (six blocks of data) will signal an error condition, indicating the buffer 22 was over filled beyond its capacity. Likewise, on a Write operation a single (one) remaining block of data will trigger an error condition.

During "Read" operations:
(a) As the P Carry increases (data being transferred from peripheral tape to buffer memory 22), the block counter $34_c$ will "shift up" indicating the buffer is being "loaded".

(b) As the S Carry increases (data from buffer memory being transferred to main host system), the block counter $34_c$ will "shift down" indicating the buffer memory is being "emptied".

During "Write" operations:

(c) As S Carry increases (data being loaded in buffer memory from main host system), the block counter $34_c$ will "shift up" to indicate the number of blocks of data in the buffer.

(d) As P Carry increases (data in buffer being unloaded for transfer to peripheral tape unit), the block counter $34_c$ will "shift down" and show how much data is left remaining in buffer 22.

During "Read" operations, when a "1" appears in the 6th bit position of block counter $34_c$, then a flip-flop circuit $34_e$ (FIG. 3) is "set" and provides a signal to the common front end circuit $10_c$ which will inform the main system of an "access-error" condition. This signifies that the buffer memory 22 was "overfilled" in that the main host system 10 did not accept data quickly enough from the buffer 22 to leave sufficient memory space for the data coming from the peripheral unit.

During "Write" operations, when the buffer memory 22 has received six blocks of data from the host system, and the 1st bit position (1 BLKFUL) becomes "0", this indicates that the buffer memory has been completely unloaded (cleared) and then the flip-flop $34_e$ is "set" to signal the common front end circuit $10_c$ that more data is required from the host 10. This indicates the host did not supply data quickly enough to the RAM buffer 22.

Thus, the Data Link Processor $20_t$ provides a system for the control of data transfers which is sensitive to the condition of the data-in-transit residing in a RAM buffer memory and by which it is possible to monitor blocks of data being transferred between peripheral units and a main host computer when there are simultaneous flows of data being put into or taken out of the RAM buffer means.

AUTOMATIC READ SYSTEM FOR MAGNETIC TAPE-PERIPHERAL CONTROLLER

Referring to FIG. 3, there is again seen a block diagram of the main elements of the peripheral dependent card PDB/1 which is used in the magnetic tape peripheral-controller.

In addition to "individual word" data transfer operations, the system operates to permit automatic transfers of data blocks without need for repeated instruction routines. Thus, the microcode from common control circuit $10_c$ (FIGS. 1, 2) can set Read/Write Selection Logic $50_a$ (FIG. 3) for either Auto Read or Auto Write enabling signals (AURDEN, AUWREN).

For data transfers between the magnetic tape peripherals (via tape control unit $50_{tc}$) and buffer memory 22, the Auto Increment Register $50_i$ is used to increment the Peripheral Address Register, $P_a$.

The Cycle Steal unit $50_s$ (FIG. 3) is used to sense when the peripheral-controller $20_t$ is not connected to the Host 10 and is not otherwise busy, so that those available cycle times may be provided for Auto Read or Auto Write operations.

In FIGS. 4, 5A, the TCU clock synchronizer 59 receives signals from the tape control unit (TCU) clock-strobe shown as TCU CLOCK input to synchronizer 59. These clock-strobe signals (TCU CLOCK) are proportional to tape speed in a connected tape unit and are asynchronous in nature in relation to the basic clock. The synchronizer 59 also receives an eight-megahertz clock signal designated CLK8/1, and acts to convert the asynchronous tape speed signal into a synchronous type signal, TCLK, FIGS. 4, 5A, 11.

The TCU clock synchronizer 59 is used during "Read" operations whereby data from a selected magnetic tape unit is sent via the tape control unit TCU $50_{tc}$ over to the main host system 10 by means of the data link processor (peripheral-controller) $20_t$. The TCU clock signal is generated within the TCU $50_{tc}$ (tape control unit) by means of an asynchronous clock generator 250 which is proportional to the speed of the particular tape unit being used. This is an asynchronous signal which can vary at any period of time according to the speed of the tape being read from.

In FIG. 4 the automatic read logic $50_r$ receives the coordination and clocking signal TCLK/ from the clock synchronizer 59 in order to synchronously regulate the timing of data transfers from the magnetic tape $50_{tc}$ over to the RAM buffer 22 of peripheral-controller $20_t$. This is done on an "automatic basis" which is regulated by the clock synchronizer 59.

The purpose of the clock synchronizer 59 is to regulate and synchronously clock the sequence of data which is read-out from the magnetic tape peripheral unit for transfer over to the RAM buffer 22 via the latches $51_e$ and $51_f$ of FIGS. 4 and 6 of the peripheral-controller $20_t$.

Thus, the clock signals (TCU) from the tape control unit $50_{tc}$ are combined with basic 8-megahertz clocking signals in order to regulate the transfer of data on an synchronously automatic basis from the magnetic tape peripheral unit to the buffer 22 of the peripheral-controller even though the peripheral tape data is emitted at different speed rates.

In FIG. 4 the bi-directional line INFO (at the top left of this drawing) connects to the peripheral tape control unit $50_{tc}$ while the bus PRIF at the upper right-hand side of FIG. 4 connects to the 4-1 multiplexor $32_x$, FIG. 3, which feeds to the RAM buffer 22. This will also be seen in FIG. 6 where the F-latch $51_f$ is seen to have an output bus which provides output connection to the RAM buffer 22.

Referring to FIG. 5A, there is shown the clock synchronizer 59 in greater detail. As seen in FIG. 5A, the TCU CLOCK signal is conveyed from the tape control unit TCU $50_{tc}$ and provides an input to receiver 141. The output of this receiver is fed to a JK flip-flop 142 and also to a D flip-flop 145. The Q output of JK 142 provides a signal INFLAG which is fed to a NAND gate 143 which has a second input designated SEND/. The SEND/ signal is provided from the common front end circuit $10_c$. The output of gate 143 is fed to gate 144 which has a second input CLK8/. The output of gate 144 provides the signal EFLATEN which is the latch enable signal for the latches shown in FIG. 6.

The output of receiver 141 in FIG. 5A is designated TCU CLOCK and is fed to the D flip-flop 145 which has a second input CLK8/. The Q output of the D flip-flop 145 provides the TCLK signal for "Automatic Read". The Q output provides a TCLK/ signal which feeds to a D flip-flop 146 to provide the TCLKFLG signal which is used for "Automatic Write" operations.

In FIG. 5B there is shown the use and development of flag signals from the tape control unit $50_{tc}$ which are used for Automatic Read operations. As seen in FIG. 5B, a signal TCLK provides input to a 2-bit counter 151 which is used to count up. This counting up is used to signify the number of clocks and hence the number of words which are being read out of the magnetic tape unit and the tape control unit. The output of the 2-bit counter 151 is fed to a count-down logic circuit 152 which provides a control signal output which feeds back to counter 151 in order to count-down. The count-down logic of 152 is used for other operations such as "Write" operations when it is necessary to count in reverse direction to quantify the number of words which are being "written" into a tape control unit rather than being taken out of it. The count-down logic 152 is provided with a signal from the output of a NAND gate 155 having inputs reflective of "Write Enable" and for automatic Write Enable, AUWE/, which derive from FIG. 3. The output of NAND gate 155 is the signal CLKCNTDN which is the clock count-down signal.

The two output lines of counter 151 are designated TCU FLG 1 and FLG 2. These lines are conveyed over to D flip-flop 153 which also has an 8-megahertz clock input. The outputs of D flip-flop 153 are designated CTCU flag 1 and flag 2. These are signals which are delayed one clock time over the signals TCU flag 1 and flag 2. The logic unit 154 receives the two CTCU flag signals (flag 1 and flag 2) and provides three output lines, designated TCUFLG, EFEMPTY and EEMPTY.

These output signals of the logic unit 154 are tabularly shown in FIG. 5C as reflective of certain conditions that occur with respect to the word latches E and F (51$_e$, 51$_f$) of FIGS. 4 and 6.

Referring to FIG. 6, there is shown the latching logic for Automatic Read operations in the magnetic tape peripheral-controller. Here in FIG. 6 it will be seen that the signal EFLATEN (E-latch, F-latch enable) are derived from the output of NAND gate 144 of FIG. 5A. This signal feeds to both NAND gates 156$_e$ and 156$_f$ of FIG. 6. The NAND gate 156$_e$ has an input EEMPTY which is shown derived in FIG. 5B in logic unit 154, while the input signal to 156$_f$ is EFEMPTY which is derived from logic unit 154 of FIG. 5B.

The output of 156$_e$ (FIG. 6) is conveyed to JK flip-flop 157 where the $\overline{Q}$ output is used to regulate the E-latch 51$_e$. The latch 51$_e$ receives words from the TCU 50$_{tc}$ as shown in FIG. 6. Thus, one word at a time is latched into the E-latch and then transferred to the F-latch 51$_f$, but this can occur only if those latches have been emptied of their previous contents as shown in FIG. 5C.

The output of NAND gate 156$_f$, FIG. 6, is fed to NAND gate 159. The other input to gate 159 comes from a JK flip-flop 158 in which JK 158 has inputs from the Automatic Read enable signal AURDEN and from the clock count down signal. The Q output of flip-flop 158 is fed to a NAND gate 160 which feeds back a clear signal to the JK flip-flop 158.

It will be noted that NAND gate 159 provides the latch enable signal to the F-latch 51$_f$ whereby the F-latch may then take a word and convey it to the RAM buffer 22 of the peripheral-controller. This RAM buffer 22, as previously noted, is located on the common front end card CFE 10$_c$ (FIG. 2 and its extension on FIG. 4 as RAM 22$_2$).

Thus, the combination effect of the latch enable signals to the E-latch and to the F-latch is to permit a word to be latched into the E-latch and then transferred and latched into the F-latch after which it can be transferred to a location in the buffer 22.

Thus, in Automatic Read operations the combination of clock signals from the tape control unit 50$_{tc}$ and the 8-megahertz basic clock signals will combine synchronously to enable the transfer of data from the magnetic tape unit to the RAM buffer 22 of the peripheral-controller.

Referring to FIG. 5C, there is seen a tabular scheme chart which indicates the relationships of the logic signals from logic unit 154, the input flag signals to the logic unit 154 and the status of the input latches for the E-latch 51$_e$ and for the F-latch 51$_f$.

As seen in FIG. 5C, when the E-latch and the F-latch are both "empty", then the output line EFEMPTY is active while the other two output lines of logic unit 154 are inactive.

When the E-latch is "empty" and the F-latch is "full", then the output logic line EFEMPTY is "inactive" while the other two lines (TCU flag A and EEMPTY) are both "active".

When both the E-latch and F-latch are full (that is to say, when each of them has a single word being held within it), then it will be seen that the TCUFLGA line is "active" while both the other two lines are "inactive".

If there should be an "error" because the latches are both full (and thus some data may have been lost in transmission), then all three output lines of the logic unit 154 will be "inactive" in order to indicate the error status.

Figure 7:
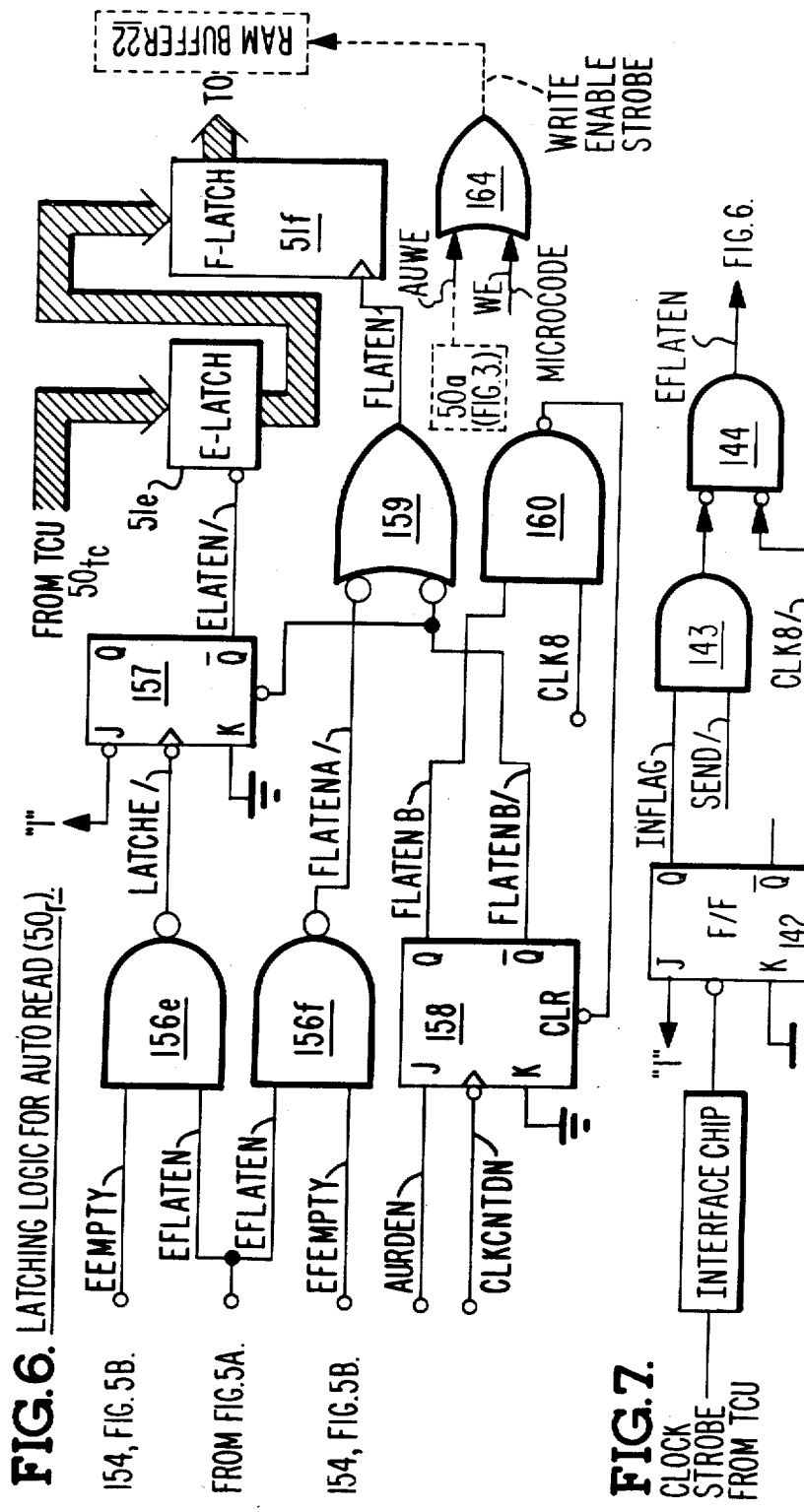
FIG. 7 is a diagram illustrating operation of the latch enable function of FIG. 5A.
Figure 8:
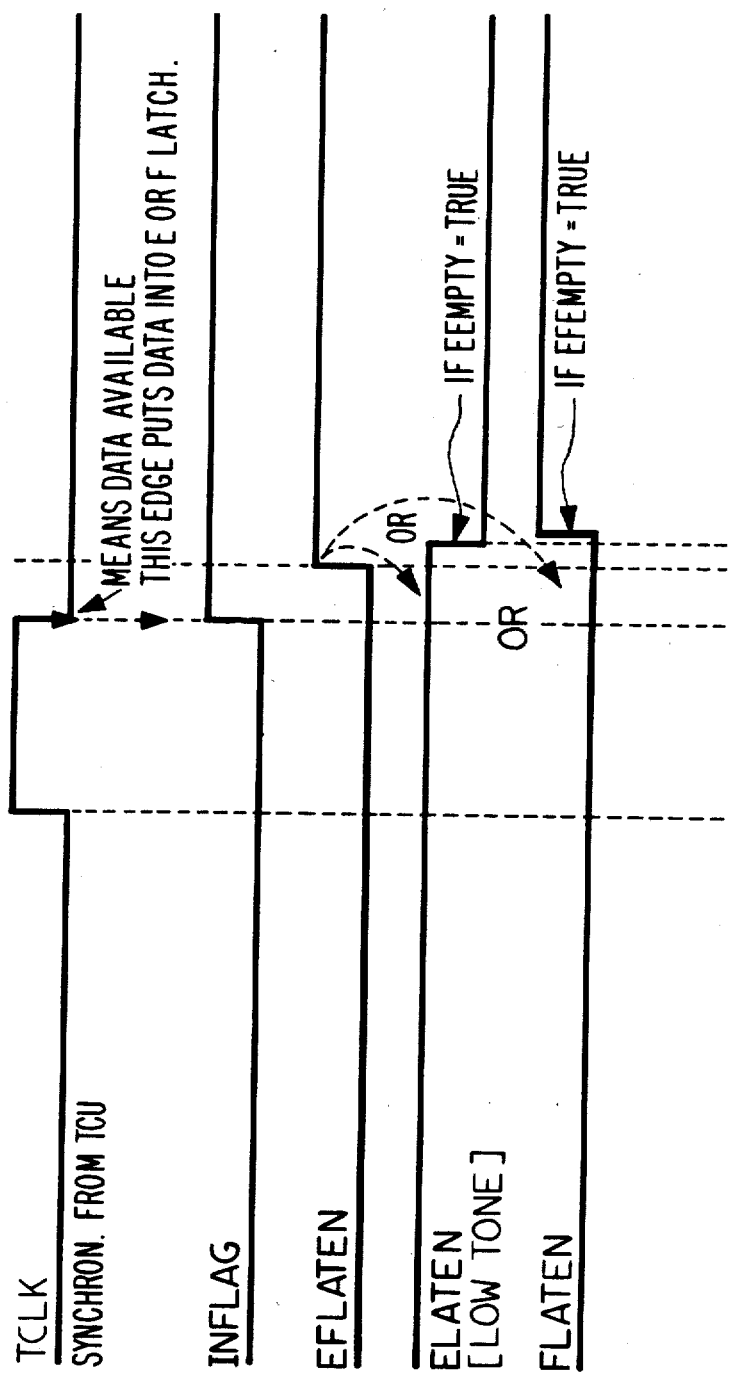
FIG. 8 is a timing diagram showing use of the automatic Read and latching circuitry.

As seen in FIG. 7 and in further clarification of FIG. 5A, the TCU clock is connected to the JK flip-flop 142 which provides the output signal INFLAG. This signal is ANDed with the SEND/ signal to provide the signal EFLATEN.

This signal (EFLATEN) means that the Read operation and the receipt of the data strobe (clock) from the tape control unit peripheral will put data into the E or F latch.

Thus, the peripheral-controller 20$_t$ provides capability for an automatic Read system whereby a peripheral tape control unit will send synchronization clocking signals which are combined with the basic 8-megahertz clock signals of the system in order to regulate the movement of individual words from a magnetic tape unit over to an "E-latch" and thence to an "F-latch" for transfer to the RAM buffer 22 for temporary storage. The circuitry of FIG. 5B will be seen to provide sensitivity to the conditions of the E-latch and the F-latch so that data transferred can be regulated as long as one of the latches (E-latch and F-latch) is empty and capable of accepting data; and further the circuit of FIG. 5B will indicate when these latches are full which would lead to an error condition whereby data transfer might be lost because the latches were both filled up.

Figure 9:
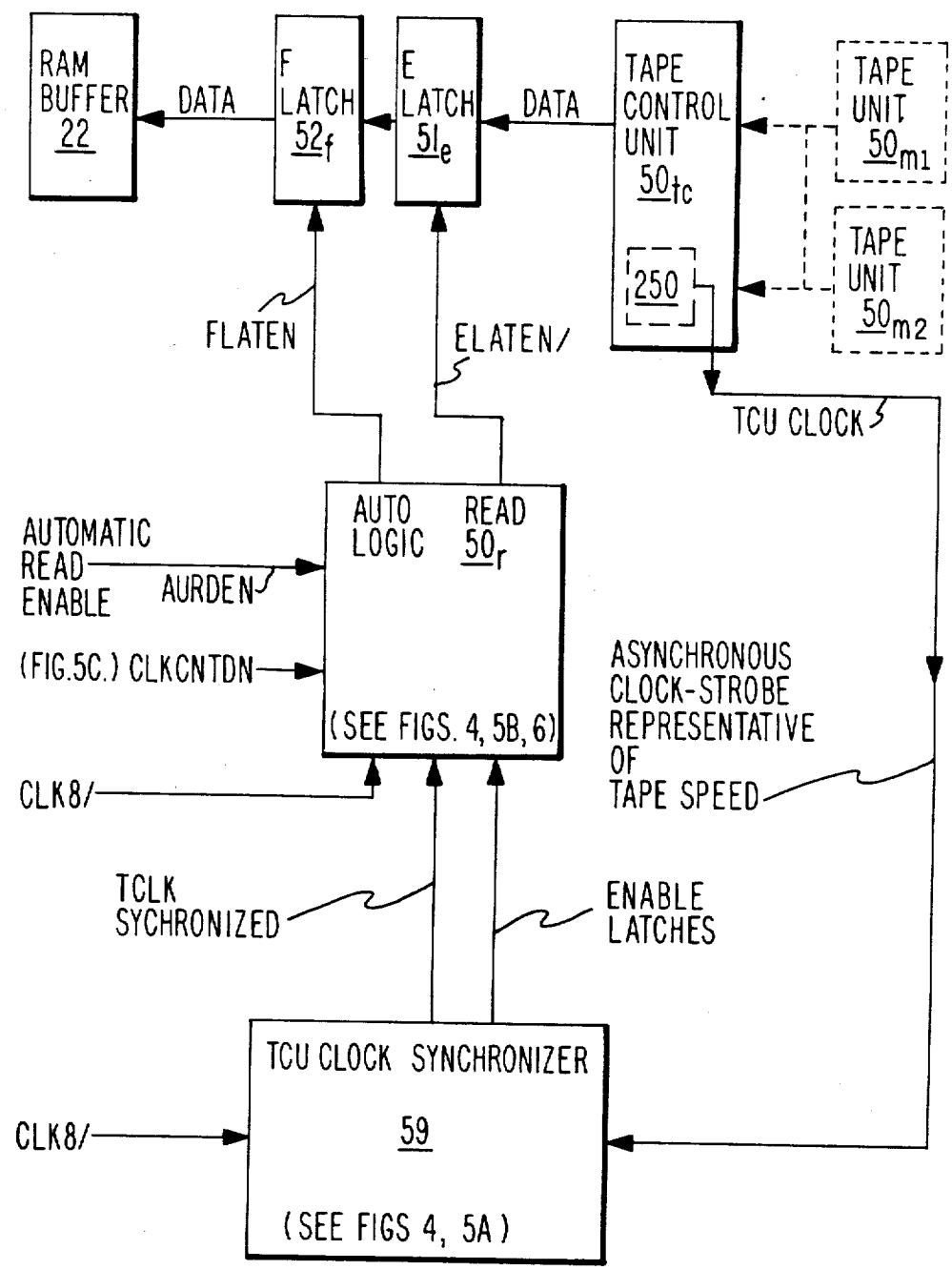
FIG. 9 is a block diagram showing the data flow from the tape unit through latches to RAM buffer while the latches are controlled by a combination of automatic read logic circuitry and synchronization circuitry.

Referring to FIG. 9 there is seen the overall system for the control of data-word transfers from a selected tape unit such as 50$_{mt}$, through the tape control unit 50$_{tc}$ over to the E latch 51$_e$, thence to the F latch 52$_f$ and thence into the RAM buffer memory 22.

The control for the word transfer from the tape peripheral unit to the buffer is done by means of the synchronizer 59 working in combination with the automatic read logic 50$_r$. The automatic read logic 50$_r$ puts out latch enabling signals shown as ELATEN and FLATEN which operate to shift data words from one latch to the other latch and over to the RAM buffer memory 22.

However, this cannot occur unless the E latch and the F latch are available to receive a data word as was previously indicated in connection with the discussion of FIG. 5C whereby a monitoring system is provided to indicate whether these latches are empty and available to receive a data word, in which case the data shift transfer can occur.

Figure 10:
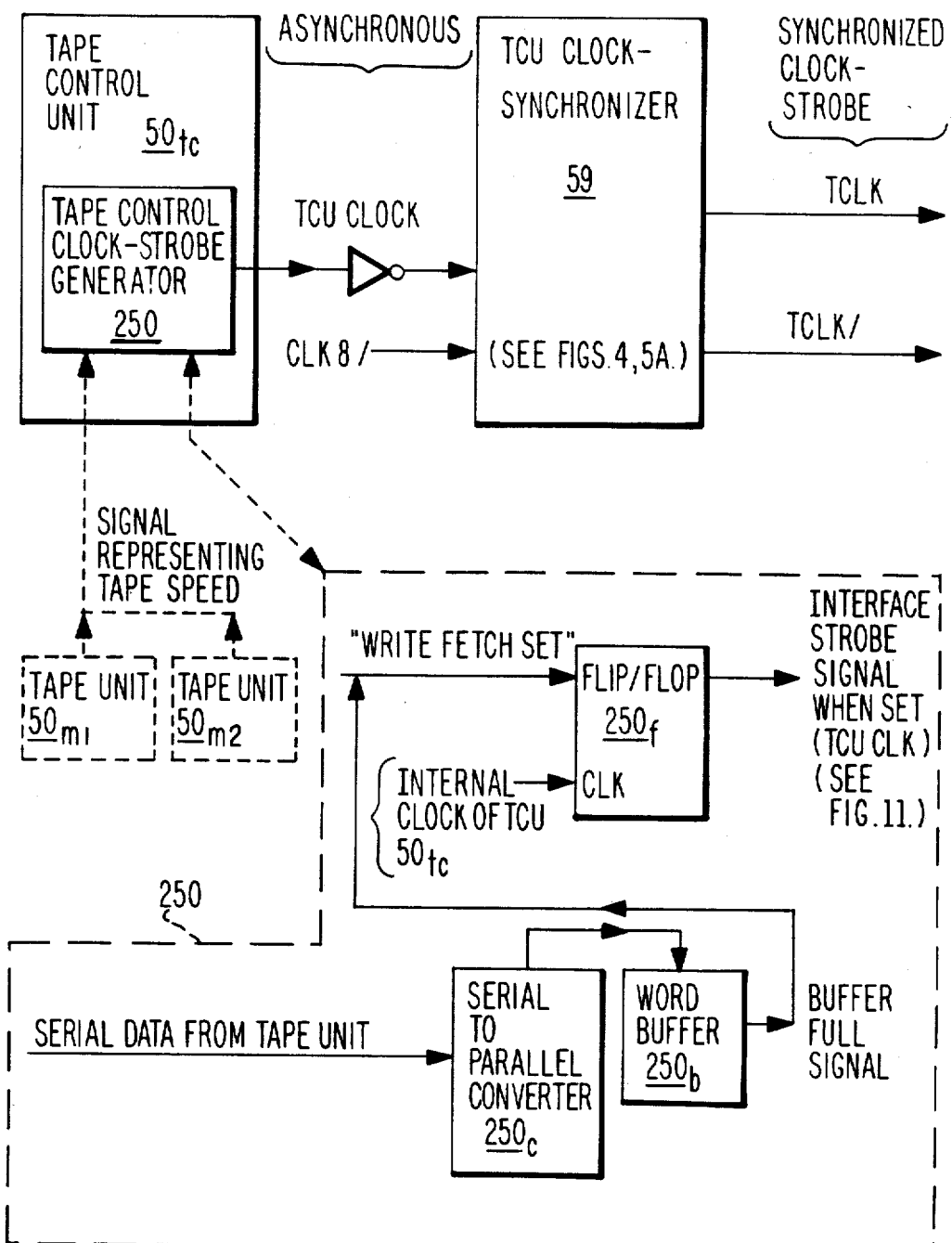
FIG. 10 ia a block diagram showing the tape speed generation sgianl being transmitted to the clock-strobe synchronizer to develop a synchronized clock-strobe signal.

In FIG. 9 there is shown a clock-strobe generator 250 which puts out a signal designated TCU CLOCK which is a signal representative of the tape speed ( and the data word output rate) of the selected tape unit being operated for data transfer. This clock-strobe signal is conveyed to the synchronizer 59 where it is combined with the basic clock signal CLK8/ in order to provide a synchronized clock-strobe signal designated TCLK/ as seen in FIGS. 9 and 10 and also in the timing diagram of FIG. 11.

Thus, the synchronizer 59 provides a signal to the Auto Read Logic $50_r$ which synchronizes the clock-strobe (TCU clock) and also provides a signal for enabling the latches E and F. The synchronizer 59 has previously been discussed in connection with FIGS. 4 and 5A.

The Auto Read Logic $50_r$ of FIG. 9 is seen being enabled by the automatic read enable signal (AURDEN) and having inputs from the basic clock CLK8/, from the synchronizer 59 by means of the TCLK signal and also the enable latches signal. Additionally, the Auto Read Logic $50_r$ has a clock "count-down" signal input, CLKCNTDN (from FIG. 5C), which will indicate when a data word has been shifted out of the E latch and F latch.

Buffers E and F ($51_e$, $52_f$) effectively give the Auto Read Logic $50_r$ more time to transfer data words from tape units to buffer memory 22 since the Auto Read Logic $50_r$ operates on a "cycle steal" system. Thus, there is provided more tolerance for the Auto Read Logic not to have to steal a cycle every other clock. Thus, with the "dual latch" system shown, the Auto Read Logic may only be required to have a "cycle steal" one in six clocks while still keeping the transfer flow of data words intact and uninterrupted.

Thus, in reference to FIG. 5B, each clock of the TCLK signal counts "up" one integer in counter 151. Then, each time that the RAM buffer 22 is enabled to receive and accept a word (as signalled on CLKCNTDN via gate 155 which indicates a write-into-RAM enable signal during automatic transfer conditions), the count-down logic 152 will reduce the count in counter 151. The CLKCNTDN signal will also convey this information to flip-flop 158 in FIG. 6. The logic unit 154 of FIG. 5B thus continuously updates the information (as to the status condition of the emptiness of the E and F latches) for the latching logic of FIG. 6. This information is summarized in FIG. 5C. In useful effect, the latches E and F act as "additional buffers" which cause a delay of one clock for each latch before a word is shifted into buffer memory 22. Thus, there is "extra time" for data words to be taken out of RAM buffer 22 to make memory space available for incoming data words into buffer 22.

The outputs of the automatic read logic $50_r$ are the latch enable signals ELATEN and also FLATEN which (as indicated in FIG. 6) operate to shift data words into and out of the latches and into the buffer 22 when the proper conditions, as indicated by FIG. 5C, permit this to happen.

As may be noted in FIG. 5C, if both latches E and F happen to be "full" (and another word from the tape control unit, TCU $50_{tc}$, arrives at the latch E, $51_e$), then the error signal will indicate that tape data was lost and not transferred to buffer 22 as required, thus resulting in "incomplete" transfer necessitating an error signal.

Referring to FIG. 10, the tape control unit $50_{tc}$ is shown with a tape control clock-strobe generator 250 which provides the asynchronous TCU clock which acts as a strobe to the synchronizer 59.

The dashed line in FIG. 10 to generator 250 indicates a more detailed block showing how the TCU clock operates as a strobe which is related to the rate of words (parallel bytes) generated according to the tape speed of a tape unit.

In FIG. 10, the "serial" data from a tape unit is fed to serial-parallel converter $250_c$ and the work (of "parallel" bits) is then placed in word buffer $250_b$. When buffer $250_b$ is "full" (one word), a Buffer Full signal is conveyed to flip-flop $250_f$. This becomes a "Write Fetch Set" signal which is clocked by the TCU internal clock to provide a strobe signal output (TCU CLOCK) from $250_f$ which signal is representative of the rate of words generated from the tape unit and which must be accepted by the latches and buffer memory of FIG. 9, in order to allow an uninterrupted flow of data words.

Figure 11:
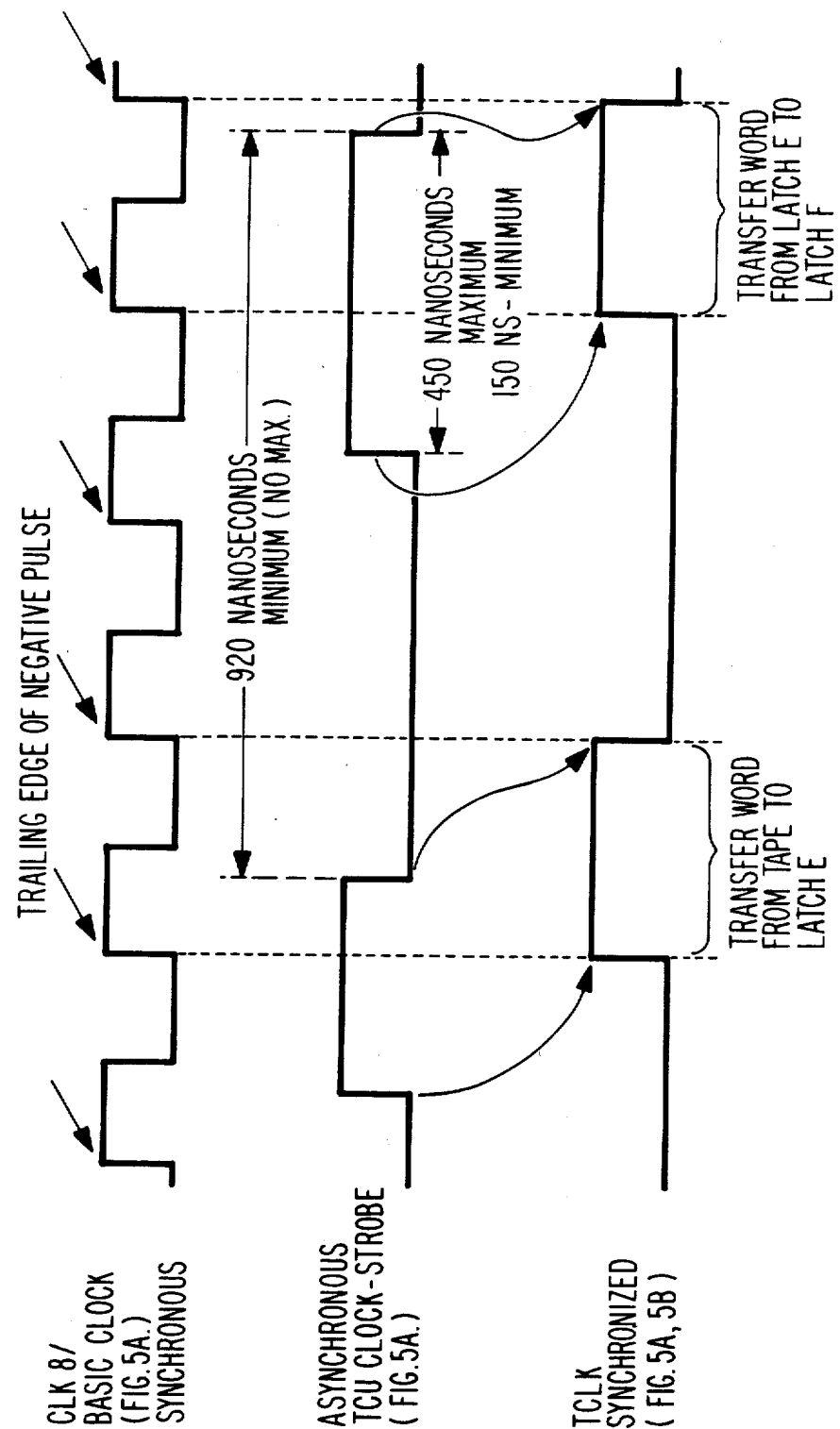
FIG. 11 is a timing diagram showing how the combination of the basic clock signal and the asynchronous clock-strobe are combined to provide a synchronized clock signal for the automatic read logic.

In FIG. 11 there is seen a timing diagram, the topmost line of which shows the basic clock signal which is a synchronous of repetitive clock signal designated CLK8/. The significant factor of this basic clock signal is the use of the "trailing edge" of the negative pulse as an activating factor as shown in the following two pulse lines beneath the top (CLK8/) set of pulse.

The second line level of FIG. 11 shows the TCU clock-strobe pulses. Here, it should be noted that these pulses relate to the speed of the tape unit which means there is a variable rate at which data words are being placed on an output bus. As shown in the TCU clock-strobe line, the minimum overall pulse cycle must be 920 nanoseconds. There is no maximum period for this pulse cycle. The "true" or up-side of this pulse cycle must have a minimum width of 150 nanoseconds and have a maximum width of 450 nanoseconds.

This, the combination of the basic clock and the TCU clock-strobe operates to form the synchronized TCLK clock-strobe signal whereby the situation is such that each positive pulse shown, as TCLK, indicates that a 16 bit word can be shifted or transferred in synchronism, at that moment, with the basic clock.

The automatic read logic $50_r$ of FIG. 9 is shown in more detail in FIGS. 5b and 6, in addition to the earlier discussion of FIG. 5C.

It should be noted (in FIGS. 4 and 6) that the RAM buffer 22 must be enabled each time that a word of data is transferred into it. This is accomplished by use of a "write-enable strobe" which is provided by the gate 164 shown in FIGS. 4 and 6. The inputs to gate 164 are the write enable, WE, signal from the microcode and the automatic write enable signal, AUWE, from the selection-control logic $50_a$ of FIG. 3. Thus, this write enable strobe works in conjunction with the other gates of the automatic logic in order to ensure that the buffer memory 22 can accept read data when it is shifted out of the latch F of FIG. 6.

As previously discussed in connection with FIG. 3, there is an automatic increment P register $50_i$ (for the peripheral address register $P_a$) which is used to increment or decrement the block counter $34_c$ whenever data is being transferred to the peripheral tape unit (write) or from the peripheral tape unit (read) to the buffer memory 22.

Now referring to FIG. 12, there is seen a OR gate 168 which is used to enable the peripheral incrementation of the block counter. Thus, in FIG. 12 the enablement of the peripheral incrementation can be satisfied by a signal from the Auto Read (or from the Auto Write) or from the processor microcode of the common front end $10_c$.

Likewise, the OR gate 164 (which was previously shown in FIG. 6) is again indicated to show the generation of a strobe signal which permits a "write" into the RAM buffer 22. This OR gate 164 can be activated by a microcode signal from the common front end $10_c$ and provides the signal, WE, which signals a write enable to the RAM buffer. The other input to the gate 164 is the "automatic write enable" signal, AUWE, which provides the ability to write into the RAM buffer 22 during the "Auto Read" operation.

The Auto Read Logic $50_r$ basically acts to function so that the F latch data word can be written into the RAM buffer 22 while the P register $P_a$ can also be incremented. This is shown in FIG. 13 where the AND gate 169 provides an output during the automatic read operation so that the peripheral register can be incremented. Similarly on the automatic read operation, the gate 173 provides a strobe to buffer 22 to permit the writing of a data word into the RAM buffer 22 from out of the F latch $51_f$ (FIG. 6).

As seen in FIG. 13, the AND gate 169 has basically six input lines. These are:
TCUFLG: which is the tape control unit flag signal output line from the logic unit 154 of FIG. 5B.
MUX-PRIF-Selected: this indicates that a peripheral unit has been selected for data transfer to the buffer memory.
P-REG-Selected: this indicates that the common front end has selected data transfers between the tape peripheral and the buffer memory 22 and that the peripheral register $P_a$ must be used to address memory areas in buffer 22 and also to enable the counting of data words transferred.
AURDEN: this signal is the automatic read enable signal which must be "on" for this read operation.
TCLK-Not Active: this means that the synchronized output (TCLK) from the synchronizer 59 is not active at that moment.
Host Access Error Line: is not active, that is to say, there is no host access error signal having occurred at that moment.

When each of the inputs to the AND gate 169 is on, then there will be provided a signal enabling the incrementation (via $50_i$) of the P register $P_a$ on the automatic read operation.

In regard to FIG. 13, there is also shown the AND gate 173 which has the same inputs as described above, except for the Host Access Error input. Thus, when each of these inputs is "on" there is a strobe sent to enable the writing of data words into the RAM buffer 22 during the automatic read operation.

Thus, it will be seen that there has been provided a unique cooperation of elements which is organized as a transfer data word control system permitting variable speed data (coming from a peripheral tape unit) to be synchronized and coordinated through a pair of latches into a RAM buffer memory. This system is seen to be the cooperative combination of elements shown in FIG. 9 whereby the data transfer path functions from the selected tape unit through the tape control unit to the E latch and the F latch and over to the RAM buffer memory 22. The coordination and control for this operation is done by the synchronizer 59 and automatic read logic $50_r$ which works in conjunction with signals from the common front end to set up an automatic read operation, whereby data will be transferred from the tape unit through the latches to the buffer memory 22 but only so long as there is a clear channel for shifting data during the time while the buffer 22 has open storage areas to accept data words. The E and F latches each provide a clock delay period which functions to give more buffering time.

Should the F latch be unable to transfer a data word into the RAM buffer 22 for any reason, then as seen in FIG. 5C when the F latch is full and the E latch is empty, there would occur one more transfer of a data word to the E latch, after which both the E latch and the F latch would be full and the output signals from logic unit 154 would tell the automatic read logic of FIG. 6 that no more word shifts could occur without signalling an error flag.

Thus, if the tape peripheral unit tried to transfer more data, it could not be transferred into the RAM buffer 22 and there would be an access error condition generated, which means that the entire operation would have to be redone or retried at such time as the RAM buffer 22 had the memory space available to accept more data words from the tape peripheral. Thus, the integrity of data is efficiently maintained, and the host system geta a clear indication of the error condition, if and when it occurs.

It should be indicated herein that there has been provided not merely a synchronizing system to permit data transfer operations from a variable asynchronous unit into a synchronously operated unit, but applicant has also provided an automatic read system which is sensitive to the conditions of the set of latches (E and F latches), whereby any hang-up or holdup in the system (whereby the RAM buffer 22 can no longer accept data) will immediately be reflected in the E and F latches so that the logic unit 154 can operate to stop any further data words from being transferred.

Thus, in this system there is an automatic read logic operation for data transfer from the peripheral which is combined with the synchronization logic (as indicated in FIGS. 5, 6, 9 and 10) whereby the system provides a rapid automatic transfer of complete blocks of word data without need for interruption to the common front end processor or to the main host computer for further instructions.

Many systems operate so that, for each instruction from the common front end processor, there is only one byte or one word transferred in any unit of cycle time rather than as in the present disclosure where there is a continuously rapid data transfer of words from the peripheral to the RAM buffer without any need for intervention or instructions from the peripheral controller or the host system. Further, this system provides "extra buffering" using two intermediate latch registers which also are monitored as to their status for continuing the "automatic read" data transfer operation or for signalling an error condition.

What is claimed is:
1. In a system for regulating the transfer of data words from a tape peripheral unit to a buffer memory means of a peripheral controller connected to a host computer, the combination comprising:

(a) a peripheral controller having a first channel means to said host computer and a second channel means to said tape peripheral unit, said peripheral controller including:
  (a1) buffer memory means for temporarily storing data words from said peripheral tape unit, said means connected to receive data words on said second channel means;
  (a2) processor means for controlling data transfer operations between said host computer and said tape peripheral unit, and including:
    (a2a) means to generate activation signals to activate an auto read logic means for automatic transfer of data words from said tape peripheral unit to said buffer memory means;
    (a2b) addressing means for addressing selected memory areas of said buffer memory means, including:
      (i) means for counting data words transferred into and out of said buffer memory means;
  (a3) first basic clock signal means for clocking said peripheral controller;
  (a4) said second channel means including:
    (a4a) latching register means, connecting said tape peripheral unit to said buffer memory means, for providing a time-delay buffer to said data words, said latching register means for shifting data words to said buffer memory means under control of said auto read logic means;
  (a5) said auto read logic means for transferring data words continuously to said buffer memory means without interruption to said peripheral controller, said auto read logic means receiving second clock signals from a synchronization logic means, and receiving said activation signals from said processor means, and including:
    p(a5a) means to signal said addressing means to increment or decrement said means for counting data words;
  (a6) said synchronization logic means for combining asynchronous second clock signals from said tape peripheral unit with said first basic clock signal means to generate said second clock signals to said auto read logic means;
(b) said tape peripheral unit connected to said second channel means and including:
  (b1) clock-strobe generation means for generating said asynchronous second clock signals which are representative of the output rate of data words generated according to the current tape speed.

2. The combination of claim 1, wherein said latching register means includes:
(a) a first latch register for temporarily storing a data word from said tape peripheral unit until shifted to a second latch register by said auto read logic means;
(b) a second latch register for temporarily storing a data word from said first latch register until shifted to said buffer memory means by said auto read logic means;
(c) and wherein each of said first and second latch registers will store a data word for at least one clock period of said basic clock signal means.

3. The combination of claim 2, wherein said auto read logic further includes:
(a) latching logic means to sense the condition of each of said first and second latch registers for sensing as to the empty or full condition of each said latch registers, and for generating word transfer enable signals to said first and second latch registers;
(b) means to sense when memory space is available in said buffer memory means and to enable the generation of said word transfer enable signals.

4. The combination of claim 3, wherein said auto read logic includes:
(a) status signal means to signal an access error to said processor means, during an automatic read operation, when said first and second latches are full and incapable of accepting data words from said tape peripheral unit.

5. The combination of claim 4, wherein said status means include:
(a) counting means, activated by said synchronization logic means, for counting data words shifted into and out of said latching register means, and providing concurrent status signals to a status logic means;
(b) said status logic means for providing status signals to a status gating means which enable the shifting of data words into and out of said latching means;
(c) said status gating means, responsive to said status signals, for enabling or inhibiting the shift of data words into or out of said latching register means.

6. The combination of claim 4, wherein said synchronization logic means includes:
(a) synchronization gating means for pulsing said status gating means to enable shift of data words into and out of said latching means.

7. In a network wherein data is transferred between a main host computer system and a magnetic tape peripheral unit via a peripheral controller, wherein said peripheral controller is initiated by commands from said host computer system to execute data transfer operations and said peripheral controller includes a common control circuit unit with microprocessor for sequencing microcode instructions and also includes a peripheral dependent circuit unit for managing said tape peripheral unit data transfers, said peripheral dependent circuit unit having its own internal basic clock unit, and an automatic read logic system for transfer of data from said magnetic tape peripheral unit to a buffer memory in said peripheral controller without need for repetitive instructions from said common control circuit unit, a transfer data word control system for moving data from a tape peripheral unit to a buffer memory in said peripheral controller, comprising in combination:
(a) buffer memory means in said peripheral controller for temporarily storing blocks of data being transferred, said buffer memory means having channels of connection to said tape peripheral unit and said host computer system;
(b) automatic selection and control means in said peripheral dependent circuit unit, activated by said common control circuit unit for enabling an automatic read logic unit;
(c) said automatic read logic unit, when enabled, functioning to transfer blocks of data words from said magnetic tape peripheral unit to said buffer memory means without further instructions from said common control circuit unit and wherein said automatic read logic unit includes:
  (c1) latching logic means for regulating the receipt of, and the output of, words of data being transferred from said tape peripheral unit to said buffer memory means, said latching logic means including:
    (c1a) a first latch register connected to receive data words from said tape peripheral unit and also receiving shift control signals from a gating logic means;

(c1b) a second latch register connected to receive data words from said first latch register and providing an output channel to said RAM buffer memory means, said second latch register receiving shift control signals from said gating means;

(c2) read logic means receiving a synchronized clock strobe signal from a synchronization logic means and including:

(c2a) gating logic means to generate data word transfer signals to said first and second latch registers for shifting data words into said buffer memory means;

said gating logic means including: (c2a1) first means to sense the empty/full condition of each of said first and second latch registers;

(c2a2) second means to sense the memory space availability in said buffer memory means;

(c2a3) third means to logically combine said first and second means to generate said data word transfer signal;

(d) said synchronization logic means for receiving asynchronous clock-strobe signals from said tape control unit for combination with said basic clock signals to generate a synchronized clock-strobe signal to said read logic means;

(e) a tape control unit connecting a plurality of magnetic tape peripheral units to said peripheral dependent circuit unit and wherein said tape control unit includes:

(e1) asynchronous clock-strobe signal generating means for providing said asynchronous clock strobe signals to said synchronization logic means representative of the rate of word transfers out from a selected one of said tape peripheral units.

8. The transfer data word control system of claim 7, wherein said read logic means includes:

(a) means for sensing the word status condition of said first and second latch registers;

(b) means for enabling said data word transfer signals to either said first and/or second latch registers when the said word status condition indicates;

(i) a latch register is empty and can accept a data word in the succeeding clock time;

(ii) said second latch register is filled by a data word and the said buffer memory means has space available to accept that data word.

9. The transfer data word control system of claim 8, wherein said read logic means includes:

(a) means to generate an access error signal to said microprocessor when said first and second latch registers are full and unable to accept data words from said tape peripheral unit.

10. The system of claim 9, wherein said peripheral controller includes:

(a) means for addressing locations in said buffer memory means when data words are entered in or taken out of said buffer memory means;

(b) counter means, connected to said means for addressing, for recording the number of data words residing in said buffer memory means at any given time and for signaling said common front end to initiate transfer operations to said host computer.

11. In a network where data is transferred from a magnetic tape peripheral unit to a main host computer via a peripheral-controller, wherein said peripheral-controller is initiated by commands from said host computer to execute data transfer operations, and said peripheral-controller includes a common front end circuit unit with microprocessor means for sequencing microcode instructions for Read operations from a tape peripheral unit, and a peripheral dependent circuit unit for managing said tape peripheral unit, a system for optimizing the throughput of data transfers, comprising in combination:

(a) buffer memory means in said pierpheral-controller having first and second channels of connection respectively to said host computer and to said tape peripheral unit, said memory means including:

(a1) multiple storage block-size areas for storage of data, each said storage area providing a block of N words, said number of block-size areas represented by a number, $B_x$;

(b) logic sensing means for counting the number of blocks of data words placed into and removed from said buffer memory means, said sensing means including:

(b1) block counter means for generating to said microprocessor means status condition signals representing the number of empty storage block-size areas and the number of data-filled block-size areas currently in said buffer memory means;

(c) said microprocessor means connected to receive said status condition signals and including:

(c1) means to execute a data transfer operation for transferring a sequence of full blocks of N words out of said buffer memory means to said host computer during a Read operation when said status condition signal indicates at least X full blocks of data words in said buffer memory means, where X represents 66% of $B_x$;

(c2) basic clock signal means for the sunchronous timing of data transfers;

(d) automatic read logic means, initiated by said microprocessor means, for synchronously transferring data words, via parallel transmission, from said tape peripheral unit to said buffer memory means, said automatic read logic means including:

(d1) latching register means for synchronously shifting data words on said second channel from a full-word buffer accumulator to said buffer memory means;

(e) tape control synchronizer means for receiving an asynchronous tape full-word strobe from said tape peripheral unit for conversion to a synchronized clock strobe using said basic clock signal means;

(f) generating means, in said tape peripheral unit, for generating said tape full-word strobe, said means including:

(f1) serial-parallel converter means for converting serial data into parallel data words for storage in a buffer accumulator means;

(f2) said buffer accumulator means for temporary storage of a data word and for parallel transfer to said latching means, said buffer accumulator means including:

(f2a) means for generating a full word strobe to said tape control synchronizer means.

12. The system of claim 11, wherein said logic sensing means includes:

(a) access error signal means, controlled by said block counter means, during a Read operation, for generating a block access error signal to said microprocessor means when the said status conditional signal represents a number greater than $B_x$, which indicates the buffer memory was overfilled and data transferred from the tape peripheral unit was lost.

13. The system of claim 11, wherein said logic sensing means includes:
(a) a first peripheral address register means connected to said microprocessor means for controlling said block counter means to count up, during Read operations, on data block transfers from said tape peripheral unit to said buffer memory means, and to count down during data block transfers from said buffer memory means to said host computer.

14. A system for minimizing access errors during data transfer operations between a magnetic tape peripheral unit and a main host computer via a buffer memory means wherein a peripheral-controller is initiated by instructions from said main host computer to manage data transfer operations between said host computer and said tape peripheral unit, and wherein said peripheral-controller includes a common front end circuit with a microprocessor means for sequencing microcode instructions and a peripheral dependent circuit unit for interfacing said magnetic tape peripheral unit, the combination comprising:
(a) common control circuit means including:
  (a1) microprocessor means for executing data transfer instructions in accord with commands received from said host computer, and including:
    (a1a) sensing means, connected to a memory status logic means in said peripheral dependent circuit unit, to receive status signals representing the number of blocks of data residing in a RAM buffer memory means;
  (a1b) means for executing data transfers according to the said status signals, said execution operating to transfer a block of N words per one instruction without interrupting said microprocessor means;
  (a1c) address generation means for addressing word storage areas of said RAM buffer memory means;
(a2) said RAM buffer memory means having data bus connections to said host computer and also to said tape peripheral unit, said memory means including:
  (a2a) multiple storage areas, each storage area providing a block of N words;
(b) said peripheral dependent circuit unit connected to said common control circuit means and including:
  (b1) said memory status logic means for receiving address data to count blocks of data words entering or leaving said RAM buffer memory means and including:
    (b1a) count logic means to maintain a count of the number of data blocks residing in said RAM buffer memory means, said count logic means providing a memory status signal to said microprocessor unit sensing means;
(c) and wherein said microprocessor unit means will initiate data transfer operations, in response to said memory status signals, from said RAM buffer memory means to said host computer only when at least $B_x$ full data blocks reside in said RAM buffer memory means awaiting transfer to said host computer, where $B_x$ is an integer equal to 2 or greater;
(d) means, initiated by said microprocessor means, for automatically transferring data words from said tape peripheral unit to said buffer memory means, said means including:
  (d1) means for converting asynchronously transmitted data words from said tape peripheral unit into synchronously transmitted data words into said buffer memory means.

15. The combination of claim 14, wherein:
(a) said microprocessor unit means will initiate data transfer operations from said RAM buffer memory means to said main host computer when at least "K" full data blocks reside in said RAM buffer memory means awaiting transfer to said main host computer where K represents 66% of the full memory capacity of said buffer memory means.

* * * * *

UNITED STATES PATENT AND TRADEMARK OFFICE
CERTIFICATE OF CORRECTION

PATENT NO. : 4,607,348
DATED : August 19, 1986
INVENTOR(S) : Jayesh V. Sheth

It is certified that error appears in the above-identified patent and that said Letters Patent is hereby corrected as shown below:

```
Col.  2, line 35, after "Serial No. 447,389.", delete period,
                  insert --, now abandoned.--
         line 45, change "maih" to --main--
Col.  4, line 37, change "sgianl" to --signal--
Col.  7, line 21, change "20_{t2}" to --20_{t}--
Col. 12, line 11, change "222" to --22_{2}--
         line 22, after "unit" delete "or"
         line 54, change ""50_{tc}" to --50_{tc}
Col. 14, line  6, after "DLP20_{t}" insert space
Col. 15, line 50, change "blocks" to --"blocks"--
Col. 16, line  3, after "CLK8/" delete "1"
         line 28, after "6" insert period and delete rest of
                  sentence
Col. 21, line 12, change "10_{c}" to --10_{c}--
         line 17, change "10_{c}" to --10_{c}--
Col. 23, line 39, before "(a5a)", delete "p"
Col. 26, line  9, change "pierpheral" to --peripheral--
         line 35, change "sunchronous" to --synchronous--
```

Signed and Sealed this

Twenty-eighth Day of October, 1986

[SEAL]

Attest:

DONALD J. QUIGG

Attesting Officer     Commissioner of Patents and Trademarks